US012707385B2

(12) United States Patent
Karaki et al.

(10) Patent No.: US 12,707,385 B2
(45) Date of Patent: Aug. 11, 2026

(54) METHODS FOR INTER-NODE REPORTING OF ENERGY CONSUMPTION RELATED INFORMATION

(71) Applicant: Telefonaktiebolaget LM Ericsson (publ), Stockholm (SE)

(72) Inventors: Reem Karaki, Aachen (DE); Angelo Centonza, Granada (ES); Henrik Rydén, Stockholm (SE); Luca Lunardi, Genoa (IT); Pablo Soldati, Solna (SE); Ioanna Pappa, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 18/557,568

(22) PCT Filed: Apr. 29, 2022

(86) PCT No.: PCT/EP2022/061550
§ 371 (c)(1),
(2) Date: Oct. 26, 2023

(87) PCT Pub. No.: WO2022/229420
PCT Pub. Date: Nov. 3, 2022

(65) Prior Publication Data

US 2024/0224175 A1 Jul. 4, 2024

Related U.S. Application Data

(60) Provisional application No. 63/182,014, filed on Apr. 30, 2021.

(51) Int. Cl.
*H04W 52/02* (2009.01)
*H04W 24/10* (2009.01)

(52) U.S. Cl.
CPC ....... *H04W 52/0206* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2010/0119000 A1* | 5/2010 | Kim | H04W 52/08 375/260 |
| 2010/0220687 A1* | 9/2010 | Reznik | H04W 36/005 370/329 |

(Continued)

FOREIGN PATENT DOCUMENTS

WO WO-2014161743 A1 * 10/2014 ........ H04W 52/0206

OTHER PUBLICATIONS

International Search Report and Written Opinion in PCT/EP2022/061550 mailed Aug. 16, 2022, 13 pages.

(Continued)

*Primary Examiner* — Brian S Roberts
(74) *Attorney, Agent, or Firm* — Rothwell, Figg, Ernst & Manbeck, P.C.

(57) ABSTRACT

A method performed by a first network is provided. The method includes the first network node generating a first message, the first message comprising a request relating to an energy or power consumption status of a second network node. The method includes transmitting the first message towards the second network node. The method includes receiving a second message transmitted by the second network node, the second message comprising a response to the first message. A method performed by a second network node is also provided. The method includes the second network node receiving a first message transmitted by a first network node, the first message comprising a request relating to an energy or power consumption status of the second (Continued)

network node. The method includes the second network node transmitting a second message towards the first network node, the second message comprising a response to the first message.

20 Claims, 14 Drawing Sheets

(56) References Cited

U.S. PATENT DOCUMENTS

2012/0282862 A1* 11/2012 Wigard ............ H04W 52/0258 455/67.11
2012/0322499 A1* 12/2012 Wei .................. H04W 36/0094 455/525
2019/0014537 A1* 1/2019 Magnusson ........... H04W 24/10
2021/0058859 A1 2/2021 Henry et al.
2021/0368437 A1* 11/2021 Kim .................. H04W 52/0212

OTHER PUBLICATIONS

3rd Generation Partnership Project; Technical Specification Group Radio Access Network; NG-RAN; Architecture description (Release 15), 3GPP TS 38.401 V15.4.0 (Dec. 2018), 40 pages.
3rd Generation Partnership Project; Technical Specification Group Services and System Aspects; Management and orchestration; 5G performance measurements (Release 17), 3GPP TS 28.552 V17.2.1 (Apr. 2021), 240 pages.
3rd Generation Partnership Project; Technical Specification Group Radio Access Network; Evolved Universal Terrestrial Radio Access Network (E-UTRAN); X2 application protocol (X2AP) (Release 16), 3GPP TS 36.423 V16.5.0 (Apr. 2021), 500 pages.

* cited by examiner

METHODS FOR INTER-NODE REPORTING OF ENERGY CONSUMPTION RELATED INFORMATION

CROSS REFERENCE TO RELATED APPLICATIONS

This application is a 35 U.S.C. § 371 National Stage of International Patent Application No. PCT/EP2022/061550, filed Apr. 29, 2022, which claims the benefit of U.S. Provisional Application No. 63/182,014 filed on Apr. 30, 2021, the entire contents of which are hereby incorporated by reference.

TECHNICAL FIELD

Disclosed are embodiments related to signaling new information between RAN nodes and internally within a RAN node that can be used by RAN noes in order to perform energy saving with more network-level awareness and/or in a coordinated matter.

BACKGROUND

3GPP has specified the Long Term Evolution (LTE) Evolved Universal Terrestrial Radio Access Network (E-UTRAN) architecture. LTE E-UTRAN comprises base stations, which are referred to as "evolvedNodeBs (eNBs)," Mobility Management Entities (MMEs), and System Architecture Evolution Gateways (S-GWs). An S1 interface connects the eNBs to the MME/S-GW, and connectivity between eNBs is supported by an X2 interface.

The current fifth generation (5G) RAN (NG-RAN) (which is also referred to as New Radio (NR)) architecture is illustrated in FIG. 1 and described in 3GPP Technical Specification (TS) 38.401v15.4.0. The NG-RAN architecture can be further described as follows. The NG-RAN includes of a set of base stations that are called "gNBs," and the gNBs are connected to the 5G Core Network (5GC) 110 through the NG interface. A gNB (100A) can be connected to another gNB (100B) through the Xn interface. An gNB can support FDD mode, TDD mode or dual mode operation. gNBs can be interconnected through the Xn interface. A gNB may consist of a gNB central unit (gnB-CU) and one or more gNB distributed units (gnB-DUs). A gNB-CU and a gNB-DU are connected via the F1 logical interface. For resiliency, a gNB-DU may be connected to multiple gNB-CU by appropriate implementation. The NG interface, the Xn interface, and the F1 interface are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to an eNB via the X2 interface. Another architectural option is that where an eNB connected to an Evolved Packet Core (EPC) network is connected over the X2 interface with a so called nr-gNB. The latter is a gNB not connected directly to a core network (CN) and connected via X2 to an eNB for the sole purpose of performing dual connectivity.

The architecture in FIG. 1 can be expanded by spitting the gNB-CU into two entities. One gNB-CU-UP, which serves the user plane (UP) and hosts the Packet Data Convergence Protocol (PDCP) protocol and one gNB-CU-CP, which serves the control plane (CP) and hosts the PDCP and Radio Resource Control (RRC) protocol. A gNB-DU also hosts lower layer protocols.

Energy Savings in LTE and NR Systems

It is advantageous to reduce the operational cost of the RAN through energy savings. This can be achieved by, among other things, turning on/off capacity cells to lower the energy consumption. The decision is typically based on cell load information. The decision can be taken by a RAN node (e.g., base station) or also by an Operation and Maintenance (O&M) function.

A gNB serving a cell that the gNB has deactivated in order to reduce energy consumption can inform a neighboring node of the deactivation by means of an NG-RAN node Configuration Update procedure over the Xn interface, as illustrated in FIG. 2B and described in 3GPP TS 38.423v16.5.0. Additionally, a gNB node can request another gNB to switch on/off a cell by means of Cell Activation procedure over Xn interface.

Additionally, a RAN node may take energy efficiency actions by reducing load in its served cells. Such reduction in load may translate into reducing the number of served user equipments (UEs) or the number of bearers, and, therefore it may enable the activation of idle periods in the usage of certain functions, such reduction in use consequently generating a saving in energy consumption.

UE Energy Efficiency

A UE is any device (e.g., smartphone, tablet, computer, sensor, appliance, residential gateway, etc.) that is capable of wirelessly communicating with a RAN node. Power and energy consumption are important operational characteristics for UEs, affecting and in some cases mandating configurations when operating in certain network and traffic scenarios. On a high level, UE energy consumption is different between the RRC states in which the UE is, such as for NR: RRC_CONNECTED, RRC_INACTIVE, RRC_IDLE. The network (NW) is expected to allow configurations where these are minimized to avoid overheating and to extend UE battery life, respectively.

There are several ways in which a UE can reduce energy consumption. These include: (1) increasing the fraction of time that the UE spends in a sleep state, especially a deep sleep where radio frequency (RF) circuitry and/or other circuitry is turned off, and (2) when monitoring signals, operating at minimum necessary receiver configurations, e.g., few antennas, narrow bandwidth (BW), minimum necessary RF quality, etc. The NW can enable and assist this by configuring and signaling to the UE numerous mechanisms. With reference to NR, a gNB can:

Configure signal monitoring (DRX) timelines that allow short monitoring intervals and long sleep intervals between them:

- Continuous DRX for data scheduling in connected mode (e.g., period, onDuration length)
- DRX for paging monitoring in idle/inactive modes (e.g., period, PO length, number of POs)

Minimize inactivity timers

- cDRX inactivity timer from last data scheduling to returning to cDRX,
- Data inactivity time from last data scheduling to returning to idle mode -continued

| |
|---|
| Enable mechanisms that pre-signal whether monitoring is necessary in upcoming intervals |
| WUS in connected mode to indicate status of next onDuration |
| PEI in idle mode to indicate status of next PO |
| Guarantee sufficient time for receiver reconfiguration from a minimal to a performance-optimized mode |
| Cross-slot scheduling specifying a minimum PDCCH/PDSCH distance |
| Indicate a PDCCH skipping duration |
| Search space (periodicity) adaptation |
| Provide guarantees about maximum required receiver performance to handle scheduled data formats |
| Indication of maximum MIMO layers that will be scheduled |
| Avoid unnecessary measurements that diminish UE sleep opportunities |
| UE measurement reduction in connected mode for stationary UEs in good conditions |
| Activate UAI functionality for the UE to indicate specific configuration preferences, etc. |

SUMMARY

Certain challenges presently exist. One attractive solution to cope with the increase in data traffic is densification either by adding more macro cells or small cells complementing the macro layer. Generally, mobile network deployments are designed assuming peak requirements in mind. However, an extreme peak capacity is not needed all the time since traffic varies. From both a cost and energy consumption point of view, this is not optimal if the additional cells or layers are operating all the time.

Current NR design includes the support of basic energy saving feature. A gNB can turn on/off capacity cells to lower the energy consumption. However, currently the gNB autonomously performs the decision without knowledge of the implication of the decision on neighboring nodes, and without taking into consideration the implication of the decision on the overall network energy consumption. The situation can get even worse if neighboring nodes take conflicting decisions. For example, a gNB autonomously deactivating cells for which it will need to move traffic to neighbor nodes, while a neighbor gNB may perform an energy efficiency (EE) decision by reducing load (shifting load to neighbors).

Even if the gNB by implementation wants to take in consideration the implication of the EE decision on a neighboring node, the current design does not provide enough information about the neighboring nodes to be able to derive such an implication. For instance, current NR design includes the support of load/capacity information exchange between different gNBs over Xn. This information alone is not enough to derive the implications of the EE decisions (such as traffic steering to that node) on the energy consumption of the neighboring node since the energy consumption is highly dependent on the gNB implementation and capabilities.

Aspects of the present disclosure provide a framework for signaling new information between neighboring RAN Nodes and internally within the RAN node, that can be used by the RAN nodes in order to perform energy savings with more network-level awareness and/or in a coordinated manner.

Accordingly, in one aspect there is provided a method performed by a first network node (110A, 1400) for coordinating with a second network node (100B, 1400) with respect to energy metric reporting. The method includes the first network node generating (s1202) a first message, the first message comprising a request relating to an energy or power consumption status of the second network node. The method includes the first network node transmitting (s1204) the first message towards the second network node. The method includes the first network node receiving (s1206) a second message transmitted by the second network node, the second message comprising a response to the first message.

In another aspect, there is provided a method performed by a second network node (100B, 1400) for reporting an energy metric to a first network node. The method includes the second network node receiving (s1302) a first message transmitted by the first network node, the first message comprising a request relating to an energy or power consumption status of the second network node. The method includes the second network node transmitting (s1304) a second message towards the first network node, the second message comprising a response to the first message.

In another aspect, there is provided a method performed by a first network node (110A, 1400) for coordinating with a second network node (110B, 1400) with respect to energy metric reporting. The method includes the first network node generating a first message (s1202), the first message comprising a request relating to an energy or power consumption status of the second network node. The method includes the first network node transmitting (s1204) the first message towards the second network node.

In another aspect there is provided a computer program (1443) comprising instructions (1444) which when executed by processing circuitry (1455) of a network node (100A, 100B, 1400) causes the network to perform the above described methods. In one embodiment, there is provided a carrier containing the computer program wherein the carrier is one of an electronic signal, an optical signal, a radio signal, and a computer readable storage medium (1442). In another aspect there is provided a network node (100A, 100B, 1400) that is configured to perform the above described methods. The network node may include memory (1408) and processing circuitry (1455) coupled to the memory.

An advantage of the embodiments disclosed herein is that at least two network nodes to request and exchange knowledge related to the energy consumption of the network nodes. Such information can be used to optimize network using a distributed RAN-level solution, while maintaining coverage, capacity and quality of service. To enable such an optimization, nodes in the network need to share more information about their energy consumption state.

Aspects disclosed herein introduce new signaling information between logical nodes of a split RAN architecture, such as gNB-CU-CP, gNB-CU-UP and gNB-DUs of a RAN node, and between RAN nodes that will allow the receiving entity to gain a better understanding of how its own and the overall network energy efficiency is impacted when taking certain actions. Improvement in the network energy efficiency has a direct impact on the operational cost of the network.

When combining the new signaling information with embodiments described herein relating to offloading a part of or all the traffic served by a cell and/or an SSB beam and/or CSI-RS beam for the purpose of energy efficiency, it can be appreciated that one advantage is to allow each node involved in these procedures (e.g. each node receiving the energy consumption metrics from neighbor nodes as well as in load balancing for energy efficiency) to understand how effective in terms of energy efficiency it is to offload certain amount of traffic. With time, such knowledge may lead to the understanding of which action is best from an energy efficiency point of view. For example, RAN nodes may determine that it is better, in a given RAN neighborhood and in specific conditions, to offload part of the cell and/or SSB beam and/or CSI-RS beam traffic to achieve energy efficiency gains instead of deactivating an entire cell or SSB beam or CSI-RS beam.

BRIEF DESCRIPTION OF THE DRAWINGS

The accompanying drawings, which are incorporated herein and form part of the specification, illustrate various embodiments.

DETAILED DESCRIPTION

In the described embodiments, a first network node is a first or a source RAN node (e.g. a gNB or an eNB) and a second network node is a second or a target RAN node (e.g. another gNB or another eNB) and the communication between the first network node and the second network node can occur directly or indirectly (e.g. directly via XnAP, X2AP or indirectly via NGAP or S1AP) or via a third node (e.g. by means of a management entity such as OAM). According to some embodiments, a network node may be any of (non-limiting list) gNB, eNB, en-gNB, ng-eNB, gNB-CU, gNB-CU-CP, gNB-CU-UP, eNB-CU, eNB-CU-CP, eNB-CU-UP, IAB-node, IAB-donor DU, IAB-donor-CU, IAB-DU, IAB-MT, O-CU, O-CU-CP, O-CU-UP, O-DU, O-RU, O-eNB. In the embodiments disclosed herein, the first network node may be the source node of the mobility event, whilst the second network node may be the target node of a mobility event involving a UE.

The term "transmit to" or "transmit towards" as used herein means "transmit directly or indirectly to." Accordingly, transmitting a message to or towards a node encompasses transmitting the message directly to the node or transmitting the message indirectly to the node such that the message is relayed to the node via one or more intermediate nodes.

Aspects of this disclosure describe a new signaling framework to report energy consumption information between RAN nodes.

Energy Status Reporting and Response Procedures

According to some embodiments, a first network node may be a first RAN node (e.g. a gNB or an eNB) and a second network node may be a second RAN node (e.g. another gNB or another eNB) and the communication between the first network node and the second network node can occur directly or indirectly (e.g. directly via XnAP, X2AP or indirectly via NGAP or S1AP).

Figure 2:
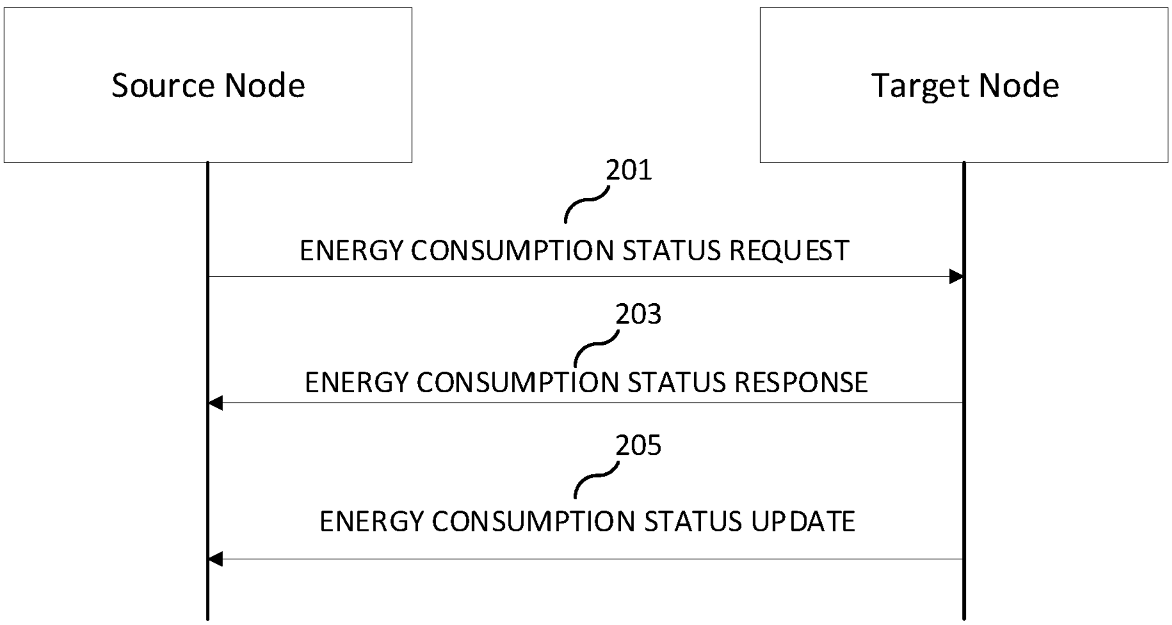
FIG. 2 is a signaling diagram according to some embodiments.

As shown in FIG. 2, the first network node initiates the procedure by sending a FIRST MESSAGE (201) comprising the request to a second network node to acquire measurements and/or estimates about the energy consumption status over a past period or over a future time interval. The estimates may be obtained for example by implementing a rule-based estimation model, a supervised machine learning model or a reinforcement learning algorithm. The request may indicate a triggering mechanism to provide the report (e.g. one-time response, or a periodic report, event-based). The FIRST MESSAGE can be an existing message (e.g. a "RESOURCE STATUS REQUEST" XnAP message, or a newly defined message (e.g. "ENERGY CONSUMPTION STATUS REQUEST" or alike).

Figure 3:
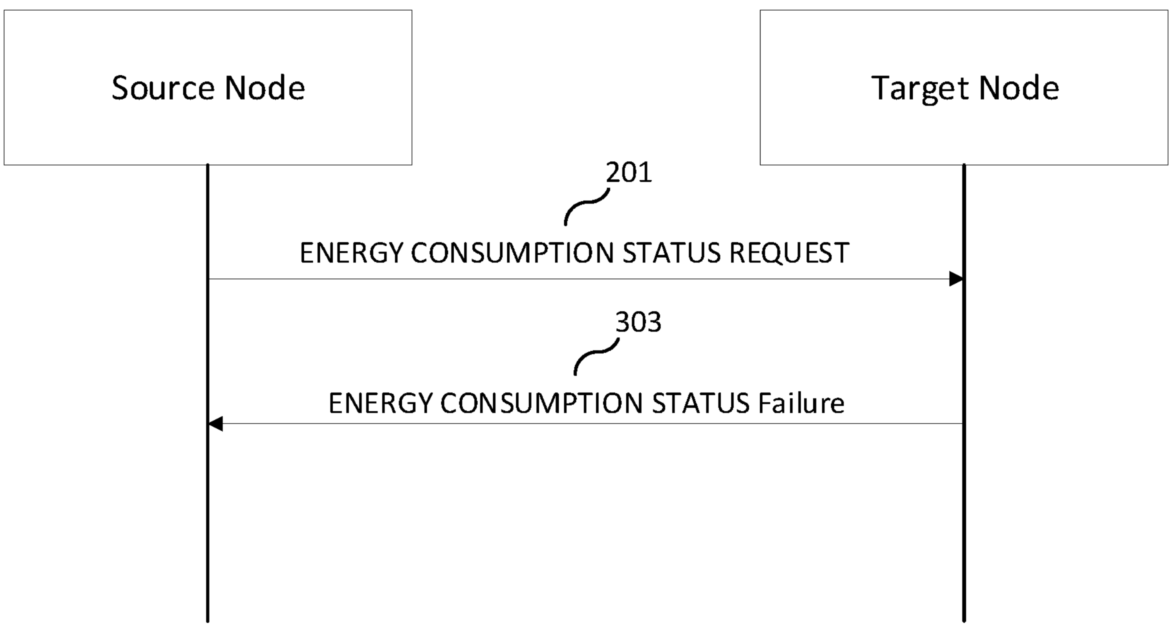
FIG. 3 is a signaling diagram according to some embodiments.

The second RAN node receives the request and performs either of the following actions as illustrated in FIGS. 2-3.

First, as shown in FIG. 2, the second node can send to the first node a SECOND MESSAGE (203), indicating a success, indicating that the second node can initiate part of or the complete set of the requested measurements and/or estimates of the energy consumption status according to the parameters indicated in the request (e.g. triggering mechanism indicated by the first node). In this case the SECOND MESSAGE can be realized as an existing message (e.g. a "RESOURCE STATUS RESPONSE" XnAP message) or a newly defined message (e.g. "ENERGY CONSUMPTION STATUS RESPONSE" message or alike). The second node can send to the first node, via a THIRD MESSAGE (205), the requested measurements and/or estimates concerning energy consumption status. The THIRD MESSAGE can be an existing message (e.g. a "RESOURCE STATUS UPDATE" message), or a newly defined message (e.g. a "ENERGY CONSUMPTION STATUS UPDATE" or alike).

Alternatively, as shown in FIG. 3, the second node can send to the first node a SECOND MESSAGE (303), indicating a failure with an appropriate cause value, if the requested measurements cannot be initiated. The SECOND MESSAGE can be an existing message (e.g. a "RESOURCE STATUS FAILURE" XnAP message or a newly defined message (e.g. "ENERGY CONSUMPTION STATUS FAILURE" or alike).

Energy Status Request

One or more of the following may be indicated in the initiation request transmitted with the FIRST MESSAGE (201) shown in FIGS. 2-3. The first node indicates the triggering mechanism for the measurement report. According to some embodiments, the triggering mechanism is a one-time report. According to some embodiments, the triggering mechanism is periodic. In this case the initiation request indicates a reporting periodicity according to which the reports should be sent. According to some embodiments, the triggering mechanism is event-based, for example, upon a change in the energy level of the second node. In this case, the initiation request may indicate a change threshold. If the change in the energy level of the second node exceeds that threshold, the second node triggers an energy status update.

The first RAN node may specify the granularity of the Energy Status Reporting, for example, the first RAN node can specify the cells or SSB beams or CSI-RS beams for which an energy report is requested. One or more of the following options can be included in the request for energy status reporting from the first RAN node.

The first node may request the measurements and/or estimates of the energy consumption status per bit, per cell, per beam (e.g. per SSB area), per RAN node, per Slice or any combination of the above granularities.

The first RAN node may request an energy status report for specific cells or SSB beam areas or other beam areas, wherein the energy status report is associated to the energy consumed to serve all or a subset of the channels, as requested by the first network node, associated to the cells and beams listed.

The first RAN node may request an energy status report for specific antenna sites or for specific transmitters and receivers. The latter can be achieved by listing identifiers that can point at the antenna site or at the transmitter/receiver, such as: (i) An identifier identifying a Radio Unit intended as a logical node including at least management of part/all of the physical layer serving one or more UEs; (ii) A cell identifier, by which the transmitters/receivers serving such cells are identifier as the subject of energy status monitoring and reporting; (iii) An identifier of a reference signal, such as an SSB identifier or a CSI-RS identifier, by which the transmitters/receivers serving such RSs are identifier as the subject of energy status monitoring and reporting.

The first RAN node may request an energy status report associated to a bearer type (guaranteed/not-guaranteed), to QoS parameters (e.g. 5QI).

The first RAN node may request an indication of the load situation corresponding to the reported energy consumption measurement.

The first RAN node may request an estimated energy consumption status corresponding to one or more load levels that are not the ones currently handled by the second node. This can be used by the initiating node to gain an understanding of how the second node's and the network's energy efficiency will be affected when taking certain actions such as offloading traffic or deactivating cells. Examples of load metrics for which the initiating node may request an estimated Energy consumption status may include: PRB utilization in uplink and/or downlink, transport network layer (TNL) load or capacity, hardware load or capacity, composite available capacity (CAC), number of active UEs, number of UEs in RRC connected mode, the initiating node may request or indicate the time window/interval corresponding to the measurement.

The first RAN node may request an estimated energy consumption at the second node resulting from a proposed action associated to the first node (offloading of UEs to the second load, cell deactivation, HO, etc.). For example, the initiating node may request an estimated energy consumption status that would reflect a forecast of the energy consumption if certain amount of load is to be offloaded to the second node. For this case the initiating node provides information about the traffic to be offloaded, e.g.: total Radio resource usage (GBR and non-GBR), data volume, total/average throughput, number of RRC connections, number of active UEs, radio conditions of the UEs to be offloaded and/or geographical location (this can include UE Radio measurements towards source and/or target node), served QoS flows, total amount of GBR and non GBR resources to be offloaded, load information such as those listed above, specified on a per network slice basis, e.g. on a per S-NSSAI, or information about the UE types to be offloaded, defined as, for example, UE categories, UE capabilities.

The first RAN node may request an estimated energy consumption of the second node resulting from a proposed/requested action for the first or for the second node (such as activating/deactivation a cell, modifying cell or beam coverage, etc.). For example, the initiating node may request an estimated energy consumption status that would reflect a forecast of the energy consumption if the second node modifies the coverage of a radio cell as requested by the first network node.

The first RAN node may request to start, pause, resume, or stop the reporting

Energy Status Response

According to some embodiments, the energy status represents an explicit or implicit indication of the energy consumed by the node during a certain time window and/or an explicit or implicit indication of the energy consumption in a future time window. The reported energy consumption metric may indicate one or more of the following non-limiting examples.

(i) A measurement of energy per bit, per cell, per beam (e.g. per SSB area), per RAN node, per network Slice or any combination of the above granularities.

(ii) A measure of energy consumption in Joule/bit.

(iii) A measure of the energy consumption in Watt per bit per Hz.

(iv) A measurement of energy consumption provided as a percentage of a nominal (e.g. maximum) value, wherein such nominal (e.g. maximum) value may be preconfigured at the RAN node.

(v) An energy per bit to noise power spectral density ratio, ENR per bit. This can be reported for a certain SNR range. The energy consumption will hence be reported as a function, with SNR values as input.

(vi) As a function, that takes load as input to the model, for example the expected energy consumed when serving X number of Users. This can allow one node to estimate the consumed energy in another node for a given or predicted load level. (vii) A representation of energy efficiency, i.e. Data Volume served by the considered network elements divided by Energy Consumption (EC) of the considered network elements. The unit of this KPI is bit/J, the Energy consumed may be calculated according to clause 5.1.1.19.3 of TS 28.552 v17.2.1, which is hereby incorporated by reference in its entirety.

(viii) An indication of the energy consumed by the node relative to the maximum energy consumption reachable by the node.

(ix) An indication of the overall possible available increase in energy consumption relative to the current energy consumption.

(x) An indication of the change in the energy consumption relative to the last reported value.

(xi) A measure comprising statistical values, for example the mean/min/max/std of the "Watt per bit per Hz."

(xii) An energy consumption index out of a predefined scale. As a non-limiting example, the node indicates an energy consumption index value from a scale of 1-10 where 10 indicates maximum energy consumption.

(xiii) An energy consumption state out of predefined states such as (low, medium, high) energy consumption.

(xiv) An indication of the energy source, for example whether the energy consumed origins from renewable sources, such as wind or solar power. The information regarding the source of the energy can in one embodiment be used for determining whether to activate/deactivate a cell. For example, turn off a cell that is powered by non-renewable energy such as oil/gas, even though it might consume less energy than a cell driven by renewable sources.

(xv) An indication of a change, e.g. a delta, with respect to a reference value or the previous reported energy consumption.

A RAN node may consist of a gNB-CU and gNB-DUs. gNB DUs may also include one or more Radio Unit (RU). A gNB-CU and a gNB-DU are connected via F1 logical interface. One gNB-DU is connected to only one gNB-CU. To be able to calculate any energy consumption related metric at the CU, the node takes into account the energy consumption of the connected DU and RUs. Hence, an indication of the energy consumptions at the DU and RU should be communicated to the CU. The CU may request the DU to report the energy consumption related metric (any of the earlier examples listed above) over the F1 interface. As a non-limiting example, the DU reports PEE, measurements (as described in 5.1.1.19.3 of TS 28.552) over F1 interface.

As another aspect of this embodiment, the response includes the current energy consumption status according as described above. The response may include one or more of the following, according to some embodiments One or more forecasted energy consumption status that correspond to the request sent by the first node, i.e. a certain load situation, and/or certain time window.

A load status report corresponding to the current/forecasted energy consumption status.

An indication if the second node is working in full or reduced capacity.

Examples of Possible Implementation

In one embodiment the energy status request and response are transferred over Xn. In such embodiments, the current procedure of resource status reporting can be used with the necessary proposed additions for energy status reporting. As explained above, the energy consumption metric can include various indications and a number of representations of the energy consumed.

In the following embodiments, an example is provided with one of the possible metrics: a measure of the energy consumption in Watt per bit per Hz variation with respect to a reference value.

Figure 4:
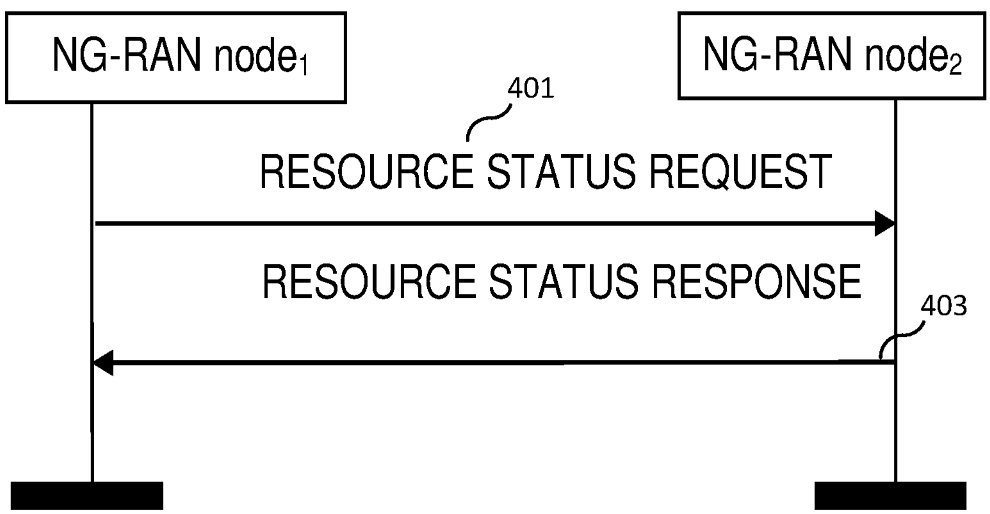
FIG. 4 is a signaling diagram according to some embodiments.
Figure 5:
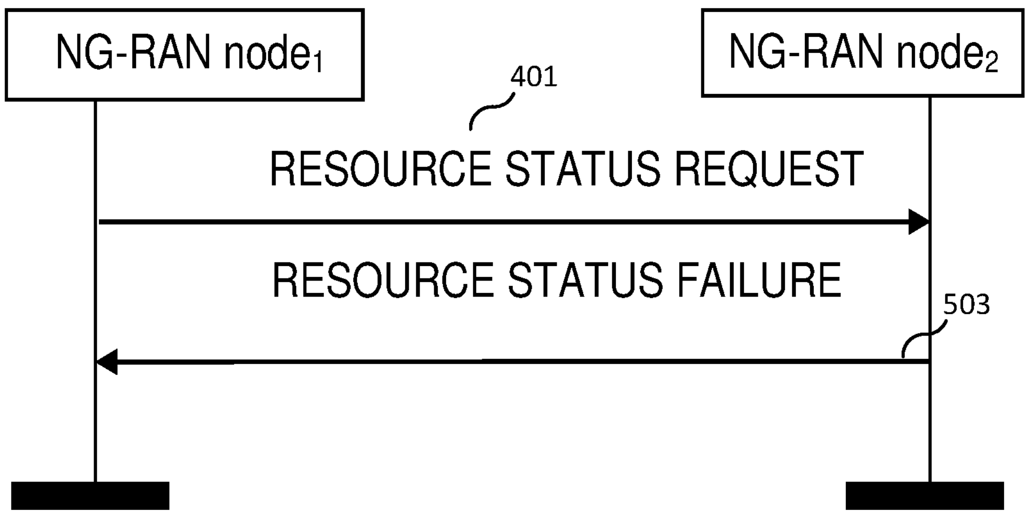
FIG. 5 is a signaling diagram according to some embodiments.
Figure 6:
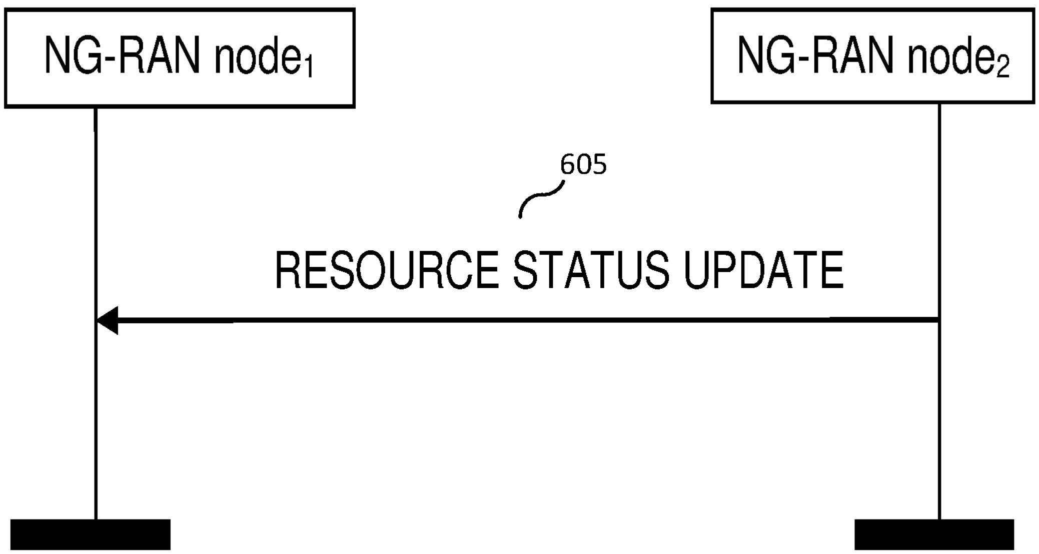
FIG. 6 is a signaling diagram according to some embodiments.

FIGS. 4-6 illustrate signaling diagrams illustrating a procedure between a first NG-RAN node to request the reporting of load measurements to another second NG-Ran node. The procedure uses non UE-associated signalling.

As shown in FIG. 4, NG-RAN node$_1$ initiates the procedure by sending the RESOURCE STATUS REQUEST message (401) to NG-RAN node$_2$ to start a measurement, stop a measurement or add cells to report for a measurement. Upon receipt, NG-RAN node$_2$: (i) shall initiate the requested measurement according to the parameters given in the request in case the Registration Request IE set to "start"; or (ii) shall stop all cells measurements and terminate the reporting in case the Registration Request IE is set to "stop"; or (iii) shall add cells indicated in the Cell To Report List IE to the measurements initiated before for the given measurement IDs, in case the Registration Request IE is set to "add". If measurements are already initiated for a cell indicated in the Cell To Report List IE, this information shall be ignored.

If the Registration Request IE is set to "start" in the RESOURCE STATUS REQUEST message and the Report Characteristics IE indicates cell specific measurements, the Cell To Report List IE shall be included.

If Registration Request IE is set to "add" in the RESOURCE STATUS REQUEST message, the Cell To Report List IE shall be included.

As shown in FIG. 4, if NG-RAN node$_2$ is capable to provide all requested resource status information, it shall initiate the measurement as requested by NG-RAN node$_1$ and respond with the RESOURCE STATUS RESPONSE message (403).

When starting a measurement, the Report Characteristics IE in the RESOURCE STATUS REQUEST indicates the type of objects NG-RAN node$_2$ shall perform measurements on. For each cell, NG-RAN node$_2$ shall include in the RESOURCE STATUS UPDATE message:

A Radio Resource Status IE, if the first bit, "PRB Periodic" of the Report Characteristics IE included in the RESOURCE STATUS REQUEST message is set to "1". If NG-RAN node$_2$ is a gNB and if the cell for which Radio Resource Status IE is requested to be reported supports more than one SSB, the Radio Resource Status IE for such cell shall include the SSB Area Radio Resource Status Item IE for all SSB areas supported by the cell. If the SSB To Report List IE is included for a cell, the Radio Resource Status IE for such cell shall include the requested SSB Area Radio Resource Status List IE.

A TNL Capacity Indicator IE, if the second bit, "TNL Capacity Ind Periodic" of the Report Characteristics IE included in the RESOURCE STATUS REQUEST message is set to "1". The received TNL Capacity Indicator IE represents the lowest TNL capacity available for the cell.

A Composite Available Capacity Group IE, if the third bit, "Composite Available Capacity Periodic" of the Report Characteristics IE included in the RESOURCE STATUS REQUEST message is set to "1". If the Cell Capacity Class Value IE is included within the Composite Available Capacity Group IE, this IE is used to assign weights to the available capacity indicated in the Capacity Value IE. If NG-RAN node$_2$ is a gNB and if the cell for which Composite Available Capacity Group IE is requested to be reported supports more than one SSB, the Composite Available Capacity Group IE for such cell shall include the SSB Area Capacity Value List for all SSB areas supported by the cell, providing the SSB area capacity with respect to the Cell Capacity Class Value. If the SSB To Report List IE is included for a cell, the Composite Available Capacity Group IE for such cell shall include the requested SSB Area Capacity Value List IE.

If the cell for which Composite Available Capacity Group IE is requested to be reported supports more than one slice, and if the Slice To Report List IE is included for a cell, the Slice Available Capacity IE for such cell shall include the requested Slice Available Capacity Value Downlink IE and Slice Available Capacity Value Uplink IE, providing the slice capacity with respect to the Cell Capacity Class Value.

The Number of Active UEs IE, if the fourth bit, "Number of Active UEs" of the Report Characteristics IE included in the RESOURCE STATUS REQUEST message is set to "1".

The RRC Connections IE, if the fifth bit, "RRC Connections" of the Report Characteristics IE included in the RESOURCE STATUS REQUEST message is set to "1".

According to aspects disclosed herein, an Energy Consumption IE is proposed, if the sixth bit, "Energy Consumption" of the Report Characteristics IE included in the RESOURCE STATUS REQUEST message is set to "1".

If the Reporting Periodicity IE in the RESOURCE STATUS REQUEST is present, this indicates the periodicity for the reporting of periodic measurements, the NG-RAN $node_2$ shall report only once, unless otherwise requested within the Reporting Periodicity IE.

FIG. 5 illustrates a signalling diagram for an unsuccessful operation. If any of the requested measurements cannot be initiated, NG-RAN $node_2$ shall send the RESOURCE STATUS FAILURE message (503) with an appropriate cause value.

For the same Measurement ID, if the initiating NG-RAN $node_1$ does not receive either the RESOURCE STATUS RESPONSE message (403) or the RESOURCE STATUS FAILURE message (503), the NG-RAN $node_1$ may reinitiate the Resource Status Reporting Initiation procedure towards the same NG-RAN node, provided that the content of the new RESOURCE STATUS REQUEST message is identical to the content of the previously unacknowledged RESOURCE STATUS REQUEST message.

If the NG-RAN $node_2$ receives a RESOURCE STATUS REQUEST message which includes the Registration Request IE set to "add" or "stop" and if the NG-RAN $node_2$ Measurement ID value received in the RESOURCE STATUS REQUEST message is not used, the NG-RAN $node_2$ shall initiate RESOURCE STATUS FAILURE message with an appropriate cause value.

If the Report Characteristics IE bitmap is set to "0" (all bits are set to "0") in the RESOURCE STATUS REQUEST message then NG-RAN $node_2$ shall initiate a RESOURCE STATUS FAILURE message with an appropriate cause value.

If the NG-RAN $node_2$ receives a RESOURCE STATUS REQUEST message which includes the Registration Request IE set to "start" and the NG-RAN $node_1$Measurement ID IE corresponding to an existing on-going load measurement reporting, then NG-RAN $node_2$ shall initiate a RESOURCE STATUS FAILURE message with an appropriate cause value.

The RESOURCE STATUS REQUEST is sent by NG-RAN $node_1$ towards the NG-RAN $node_2$ to initiate the requested measurement according to the parameters given in the message described in Tables 1-3, below. As shown in Table 1 below, the Report Characteristics is modified to include a sixth bit pertaining to energy consumption.

TABLE 1

| IE/Group Name | Presence | Range | IE type and reference | Semantics description | Criticality | Assigned Criticality |
|---|---|---|---|---|---|---|
| Message Type | M | | 9.2.3.1 | | YES | reject |
| NG-RAN node1 Measurement ID | M | | INTEGER (1 . . . 4095, . . .) | Allocated by NG-RAN $node_1$ | YES | reject |
| NG-RAN node2 Measurement ID | C-ifRegistrationRequestStoporAdd | | INTEGER (1 . . . 4095, . . .) | Allocated by NG-RAN $node_2$ | YES | ignore |
| Registration Request | M | | ENUMERATED (start, stop, add, . . .) | Type of request for which the resource status is required. | YES | reject |
| Report Characteristics | C-ifRegistrationRequestStart | | BITSTRING (SIZE(32)) | Each position in the bitmap indicates measurement object the NG-RAN node2 is requested to report. First Bit = PRB Periodic, Second Bit = TNL Capacity Ind Periodic, Third Bit = Composite Available Capacity Periodic, Fourth Bit = Number of Active UEs, Fifth Bit = RRC connections, Sixth Bit = Energy consumption. | YES | reject |

TABLE 1-continued

| IE/Group Name | Presence | Range | IE type and reference | Semantics description | Criticality | Assigned Criticality |
|---|---|---|---|---|---|---|
| | | | | Other bits shall be ignored by the NG-RAN node2. | | |
| Cell To Report List | | 0 . . . 1 | | Cell ID list to which the request applies. | YES | ignore |
| >Cell To Report Item | | 1 . . . <maxnoofCellsinNG-RANnode> | | | — | |
| >>Cell ID | M | | Global NG-RAN Cell Identity 9.2.2.27 | | — | |
| >>SSB To Report List | | 0 . . . 1 | | SSB list to which the request applies. | — | |
| >>>SSB To Report Item | | 1 . . . <maxnoofSSBAreas> | | | — | |
| >>>>SSB-Index | M | | INTEGER (0 . . . , 63 . . .) | | — | |
| >>Slice To Report List | | 0 . . . 1 | | S-NSSAI list to which the request applies. | — | |
| >>>Slice To Report Item | | 1 . . . <maxnoofBPLMNs> | | | — | |
| >>>>PLMN Identity | M | | 9.3.1.14 | Broadcast PLMN | — | |
| >>>>S-NSSAI List | | 1 | | | — | |
| >>>>>S-NSSAI Item | | 1 . . . <maxnoofSliceItems> | | | — | |
| >>>>>>S-NSSAI | M | | S-NSSAI 9.3.1.38 | | — | |
| Reporting Periodicity | O | | ENUMERATED (500 ms, 1000 ms, 2000 ms, 5000 ms, 10000 ms, . . .) | Periodicity that can be used for reporting of PRB Periodic, TNL Capacity Ind Periodic, Composite Available Capacity Periodic. Also used as the averaging window length for all measurement object if supported. | YES | ignore |

TABLE 2

| Condition | Explanation |
|---|---|
| ifRegistrationRequestStoporAdd | This IE shall be present if the Registration Request IE is set to the value “stop” or “add”. |
| ifRegistrationRequestStart | This IE shall be present if the Registration Request IE is set to the value “start”. |

TABLE 3

| Range bound | Explanation |
|---|---|
| maxnoofCellsinNG-RANnode | Maximum no. cells that can be served by a NG-RAN node. Value is 16384. |

TABLE 3-continued

| Range bound | Explanation |
|---|---|
| maxnoofSSBAreas | Maximum no. SSB Areas that can be served by a NG-RAN node cell. Value is 64. |
| maxnoofSliceItems | Maximum no. of signalled slice support items. Value is 1024. |

FIG. 6 illustrates a signaling diagram for resource status reporting, according to some embodiments. This procedure may be initiated by an NG-RAN node to report the result of measurements admitted by the NG-RAN node following a successful Resource Status Reporting Initiation procedure. The procedure uses non UE-associated signalling. The NG-RAN node$_2$ shall report the results of the admitted measurements in RESOURCE STATUS UPDATE message (605). The admitted measurements are the measurements that were successfully initiated during the preceding Resource Status Reporting Initiation procedure.

Tables 4-5 below illustrates the contents of the RESOURCE STATUS UPDATE message sent by NG-RAN $node_2$ towards NG-RAN $node_1$ to report the results of the requested measurements. As shown in Table 4 below, an "Energy Consumption Status" is included.

TABLE 4

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| NG-RAN node1 Measurement ID | M | | INTEGER (1 . . . 4095, . . .) | Allocated by NG-RAN $node_1$ | YES | reject |
| NG-RAN node2 Measurement ID | M | | INTEGER (1 . . . 4095, . . .) | Allocated by NG-RAN $node_2$ | YES | reject |
| Cell Measurement Result | | 1 | | | YES | ignore |
| >Cell Measurement Result Item | | 1 . . . <maxnoofCellsinNG-RANnode > | | | YES | ignore |
| >>Cell ID | M | | Global NG-RAN Cell Identity 9.2.2.27 | | — | |
| >>Radio Resource Status | O | | 9.2.2.50 | | — | |
| >>TNL Capacity Indicator | O | | 9.2.2.49 | | — | |
| >>Composite Available Capacity Group | O | | 9.2.2.51 | | — | |
| >>Slice Available Capacity | O | | 9.2.2.55 | | — | |
| >>Number of Active UEs | O | | 9.2.2.62 | | — | |
| >> RRC Connections | O | | 9.2.2.56 | | — | |
| Energy Consumption Status | O | | 9.2.2.x | | — | |

TABLE 5

| Range bound | Explanation |
|---|---|
| maxnoofCellsinNG-RANnode | Maximum no. cells that can be served by a NG-RAN node. Value is 16384. |

According to some embodiments, the new Energy Consumption status IE defines energy consumption status related metrics. Table 6 below includes possible metrics that may be specified by the Energy Consumption Status IE.

In other embodiments, the energy status request and response are transferred over F1. To that end the current procedure of resource status reporting can be used with the necessary proposed additions.

In the following embodiments, an example is provided with one of the possible metrics: a measure of the energy consumption in Watt per bit per Hz variation with respect to a reference value.

TABLE 6

| IE/Group Name | Presence | Range | IE Type and Reference | Semantics Description |
|---|---|---|---|---|
| Cell level energy consumption status | M | | | |
| > Energy consumption status | M | | INTEGER (0 . . . 100) | Value 0 indicates a minimum energy consumption level, and 100 indicates the maximum energy consumption level. Measured on a linear scale. |
| > Estimated Energy consumption status | O | | INTEGER (0 . . . 100) | Value 0 indicates a minimum energy consumption level, and 100 indicates the maximum energy consumption level. Measured on a linear scale. |

Figure 7:
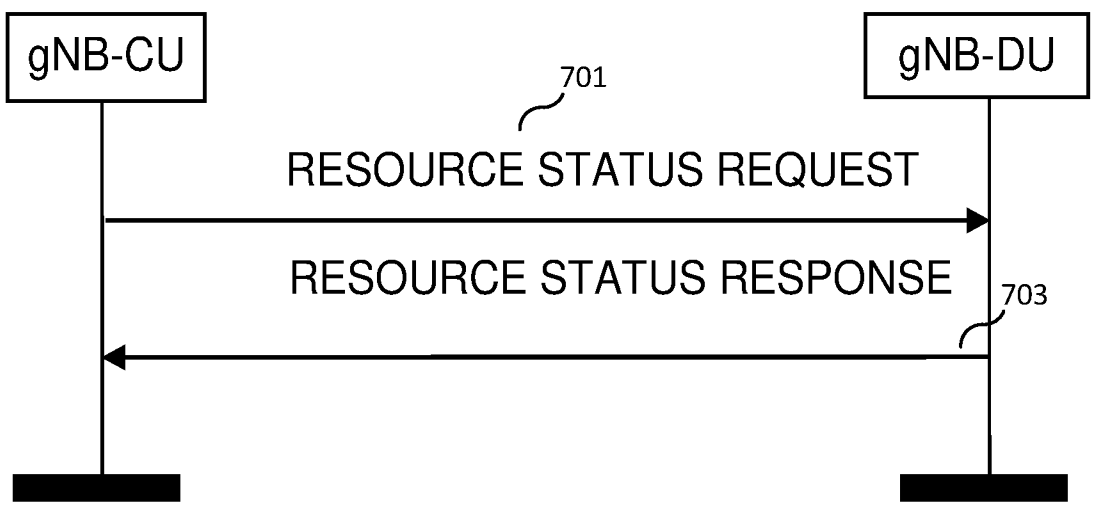
FIG. 7 is a signaling diagram according to some embodiments.
Figure 8:
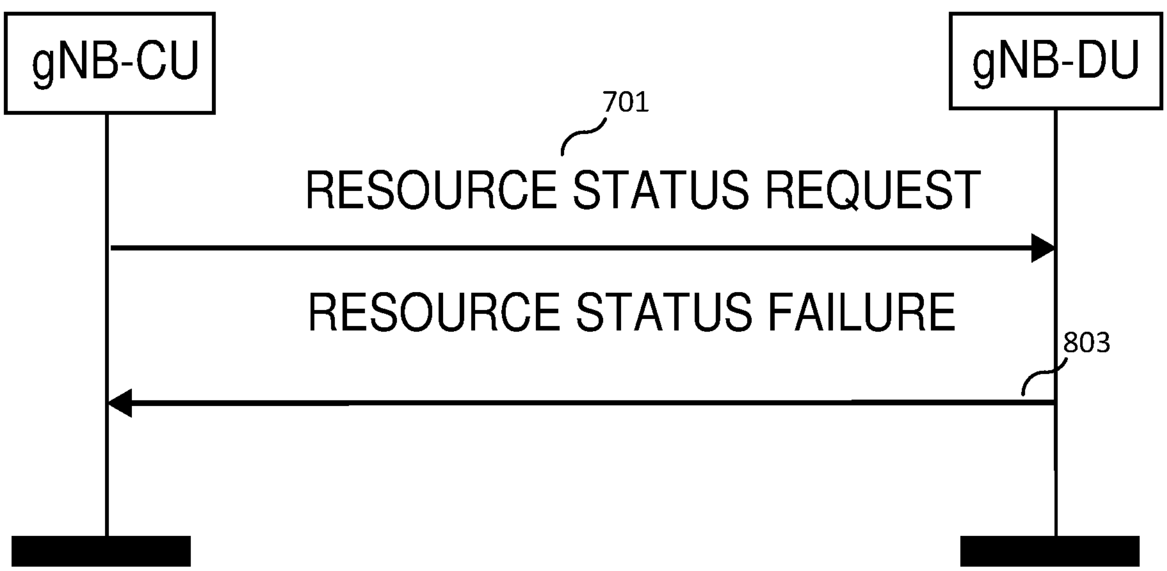
FIG. 8 is a signaling diagram according to some embodiments.
Figure 9:
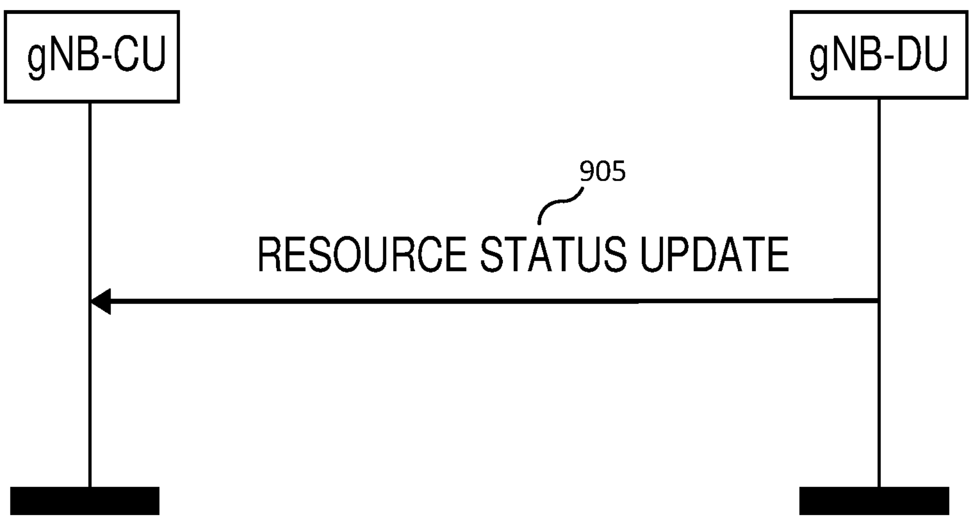
FIG. 9 is a signaling diagram according to some embodiments.

FIGS. 7-9 illustrate signaling diagrams illustrating a procedure between a gNB-CU to request the reporting of load measurements to a GNB-DU. The procedure uses non UE-associated signalling.

As shown in FIGS. 7-8, the gNB-CU initiates the procedure by sending the RESOURCE STATUS REQUEST message (701) to gNB-DU to start a measurement, stop a measurement, or add cells to report for a measurement. Upon receipt, gNB-DU: (i) shall initiate the requested measurement according to the parameters given in the request in case the Registration Request IE set to "start"; or (ii) shall stop all cells measurements and terminate the reporting in case the Registration Request IE is set to "stop"; or (iii) shall add cells indicated in the Cell To Report List IE to the measurements initiated before for the given measurement IDs, in case the Registration Request IE is set to "add". If measurements are already initiated for a cell indicated in the Cell To Report List IE, this information shall be ignored.

If the Registration Request IE is set to "start" in the RESOURCE STATUS REQUEST message and the Report Characteristics IE indicates cell specific measurements, the Cell To Report List IE shall be included.

If Registration Request IE is set to "add" in the RESOURCE STATUS REQUEST message, the Cell To Report List IE shall be included.

As shown in FIG. 7, if gNB-DU is capable to provide all requested resource status information, it shall initiate the measurement as requested by gNB-CU, and respond with the RESOURCE STATUS RESPONSE message (703).

When starting a measurement, the Report Characteristics IE in the RESOURCE STATUS REQUEST indicates the type of objects gNB-DU shall perform measurements on. For each cell, gNB-DU shall include in the RESOURCE STATUS UPDATE message:

The Radio Resource Status IE, if the first bit, "PRB Periodic" of the Report Characteristics IE included in the RESOURCE STATUS REQUEST message is set to 1. If the cell for which Radio Resource Status IE is requested to be reported supports more than one SSB, the Radio Resource Status IE for such cell shall include the SSB Area Radio Resource Status Item IE for all SSB areas supported by the cell. If the SSB To Report List IE is included for a cell, the Radio Resource Status IE for such cell shall only include the SSB Area Radio Resource Status List IE.

The TNL Capacity Indicator IE, if the second bit, "TNL Capacity Ind Periodic" of the Report Characteristics IE included in the RESOURCE STATUS REQUEST message is set to 1.

The Composite Available Capacity Group IE, if the third bit, "Composite Available Capacity Periodic" of the Report Characteristics IE included in the RESOURCE STATUS REQUEST message is set to 1. If Cell Capacity Class Value IE is included within the Composite Available Capacity Group IE, this IE is used to assign weights to the available capacity indicated in the Capacity Value IE. If the cell for which Composite Available Capacity Group IE is requested to be reported supports more than one SSB the Composite Available Capacity Group IE for such cell shall include the SSB Area Capacity Value List IE for all SSB areas supported by the cell, providing the SSB area capacity with respect to the Cell Capacity Class Value IE. If the SSB To Report List IE is included for a cell, the Composite Available Capacity Group IE for such cell shall include the requested SSB Area Capacity Value List IE providing the SSB area capacity with respect to the Cell Capacity Class Value. If the cell for which Composite Available Capacity Group IE is requested to be reported supports more than one slice, and if the Slice To Report List IE is included for a cell, the Slice Available Capacity IE for such cell shall include the requested Slice Available Capacity Value Downlink IE and Slice Available Capacity Value Uplink IE, providing the slice capacity with respect to the Cell Capacity Class Value.

The Hardware Load Indicator IE, if the fourth bit, "HW LoadInd Periodic" of the Report Characteristics IE included in the RESOURCE STATUS REQUEST message is set to 1.

The Number of Active UEs IE, if the fifth bit, "Number of Active UEs" of the Report Characteristics IE included in the RESOURCE STATUS REQUEST message is set to 1.

According to aspects disclosed herein, an Energy consumption IE is proposed, if the sixth bit, "Energy consumption" of the Report Characteristics IE included in the RESOURCE STATUS REQUEST message is set to 1.

If the Reporting Periodicity IE in the RESOURCE STATUS REQUEST is present, this indicates the periodicity for the reporting of periodic measurements. The gNB-DU shall report once, unless otherwise requested within the Reporting Periodicity IE.

As shown in FIG. 8, if any of the requested measurements cannot be initiated, gNB-DU shall send the RESOURCE STATUS FAILURE message (803) with an appropriate cause value.

If the initiating gNB-CU does not receive either RESOURCE STATUS RESPONSE message or RESOURCE STATUS FAILURE message, the gNB-CU may reinitiate the Resource Status Reporting Initiation procedure towards the same gNB-DU, provided that the content of the new RESOURCE STATUS REQUEST message is identical to the content of the previously unacknowledged RESOURCE STATUS REQUEST message with the same Transaction ID.

If the Report Characteristics IE bitmap is set to "0" (all bits are set to "0") in the RESOURCE STATUS REQUEST message then gNB-DU shall initiate a RESOURCE STATUS FAILURE message with an appropriate cause value.

If the gNB-DU receives a RESOURCE STATUS REQUEST message which includes the Registration Request IE set to "start" and the gNB-CU Measurement ID IE corresponding to an existing on-going load measurement reporting, for which a different Transaction ID is used, then gNB-DU shall initiate a RESOURCE STATUS FAILURE message with an appropriate cause value.

The RESOURCE STATUS REQUEST is sent by gNB-CU towards gNB-DU to initiate the requested measurement according to the parameters given in the message described in Tables 7-9, below. As shown in Table 7 below, the Report Characteristics is modified to include a sixth bit pertaining to energy consumption.

TABLE 7

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU | M | | INTEGER | Allocated by gNB- | YES | reject |

TABLE 7-continued

| IE/Group Name | Presence | Range | IE type and reference | Semantics description | Criticality | Assigned Criticality |
|---|---|---|---|---|---|---|
| Measurement ID | | | (1 . . . 4095, . . .) | CU | | |
| gNB-DU Measurement ID | C-ifRegistra-tionRequestStoporAdd | | INTEGER (1 . . . 4095, . . .) | Allocated by gNB-DU | YES | ignore |
| Registration Request | M | | ENUMERATED(start, stop, add, . . .) | Type of request for which the resource status is required. | YES | ignore |
| Report Characteristics | C-ifRegistrationRequestStart | | BIT STRING (SIZE(32)) | Each position in the bitmap indicates measurement object the gNB-DU is requested to report. First Bit = PRB Periodic, Second Bit = TNL Capacity Ind Periodic, Third Bit = Composite Available Capacity Periodic, Fourth Bit = HW LoadInd Periodic, Fifth Bit = Number of Active UEs, Sixth Bit = Energy consumption Other bits shall be ignored by the gNB-DU. | YES | ignore |
| Cell To Report List | | 0 . . . 1 | | Cell ID list to which the request applies. | YES | ignore |
| >Cell To Report Item | | 1 . . . <maxCellingNBDU> | | | | |
| >>Cell ID | M | | NR CGI 9.3.1.12 | | — | |
| >>SSB To Report List | | 0 . . . 1 | | SSB list to which the request applies. | — | |
| >>>SSB To Report Item | | 1 . . . <maxnoofSSBAreas> | | | — | |
| >>>>SSB index | M | | INTEGER (0 . . . 63) | | | |
| >>Slice To Report List | | 0 . . . 1 | | S-NSSAI list to which the request applies. | — | |
| >>>Slice To Report Item | | 1 . . . <maxnoofBPLMNsNR> | | | | |
| >>>>PLMN Identity | M | | 9.3.1.14 | Broadcast PLMN | | |
| >>>>S-NSSAI List | | 1 | | | — | |
| >>>>>S-NSSAI Item | | 1 . . . <maxnoofSliceItems> | | | — | |
| >>>>>>S-NSSAI | M | | 9.3.1.38 | | — | |
| Reporting Periodicity | O | | ENUMERATED(500 ms, 1000 ms, 2000 ms, 5000 ms, 10000 ms, . . .) | Periodicity that can be used for reporting of PRB Periodic, TNL Capacity Ind Periodic, Composite Available Capacity Periodic. Also used as the averaging window length for all measurement object if supported. | YES | ignore |

TABLE 8

| Condition | Explanation |
|---|---|
| ifRegistrationRequestStoporAdd | This IE shall be present if the Registration Request IE is set to the value "stop" or "add". |
| ifRegistrationRequestStart | This IE shall be present if the Registration Request IE is set to the value "start". |

TABLE 9

| Range bound | Explanation |
|---|---|
| maxCellingNBDU | Maximum no. cells that can be served by a gNB-DU. Value is 512. |
| maxnoofSSBAreas | Maximum no. SSB Areas that can be served by a NG-RAN node cell. Value is 64. |
| maxnoofSliceItems | Maximum no. of signalled slice support items. Value is 1024. |
| maxnoofBPLMNsNR | Maximum no. of PLMN Ids.broadcast in a cell. Value is 12. |

FIG. 9 is a signaling diagram illustrating resource status reporting. This procedure is initiated by gNB-DU to report the result of measurements admitted by gNB-DU following a successful Resource Status Reporting Initiation procedure. The gNB-DU shall report the results of the admitted measurements in RESOURCE STATUS UPDATE message (905). The admitted measurements are the measurements that were successfully initiated during the preceding Resource Status Reporting Initiation procedure.

Tables 10-11 below illustrates the contents of the RESOURCE STATUS UPDATE message sent by gNB-DU towards gNB-CU to report the results of the requested measurements. As shown in Table 10 below, an "Energy Consumption Status" is included.

TABLE 10

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | reject |
| gNB-CU Measurement ID | M | | INTEGER (1 . . . 4095, . . .) | Allocated by gNB-CU | YES | reject |
| gNB-DU Measurement ID | M | | INTEGER (1 . . . 4095, . . .) | Allocated by gNB-DU | YES | ignore |
| Hardware Load Indicator | O | | 9.3.1.136 | | YES | ignore |
| TNL Capacity Indicator | O | | 9.3.1.128 | | YES | ignore |
| Cell Measurement Result | | 0 . . . 1 | | | YES | ignore |
| >Cell Measurement Result Item | | 1 . . . <maxCellingNBDU> | | | — | |
| >>Cell ID | M | | NR CGI 9.3.1.12 | | — | |
| >>Radio Resource Status | O | | 9.3.1.129 | | — | |
| >>Composite Available Capacity Group | O | | 9.3.1.130 | | — | |
| >>Slice Available Capacity | O | | 9.3.1.134 | | — | |
| >>Number of Active UEs | O | | 9.3.1.135 | | — | |
| >> Energy Consumption | O | | 9.3.1.x | | — | |

TABLE 11

| Range bound | Explanation |
|---|---|
| maxCellingNBDU | Maximum no. cells that can be served by a gNB-DU. Value is 512. |

According to some embodiments, the new Energy Consumption status IE defines energy consumption status related metrics. Table 12 below includes possible metrics that may be specified by the Energy Consumption Status IE. This IE defines the energy consumption metric expressed as a measure of the energy consumption variation in Watt per bit per Hz with respect to a reference value.

TABLE 12

| IE/Group Name | Presence | Range | IE Type and Reference | Semantics Description |
|---|---|---|---|---|
| Energy consumption | M | | INTEGER (0 . . .) | |

Similar additions may be envisioned for the X2 and E1 interface.

Indirect Transfer of the Energy Consumption Information Between the RAN Nodes

In another embodiment a first RAN node supporting one or more RATs, e.g. NR, may signal to a second RAN node supporting the same or different RATs information about the intended or the occurred action of improving energy efficiency by means of: (i) de-activation of cell(s) and/or SSB beam(s) and/or CSR RS beam area(s), (ii) deduction of coverage for cell(s) and/or SSB beam(s) and/or CSR RS beam area(s), (iii) deactivation of specific communication channels for cell(s) and/or SSB beam(s) and/or CSR RS beam area(s), or any of the methods described above.

Such signaling may occur via an in-direct interface between the first and the second RAN node, e.g. via an interface established between the first RAN node and the CN and from the CN to the second RAN node. In such signaling the first RAN node may include metrics concerning its current energy consumption level and the predicted energy consumption levels if the actions above to improve EE are taken. The second RAN node may respond providing a metric as the ones described above.

According to some embodiments, the RAN-CN interface used for signaling of the information described is the NG-C interface. In another embodiment the RAN-CN interface used for signaling of the information described is the S1 interface. In another embodiment the RAN-CN interface used for signaling of the information described is a combination of the NG-C interface (e.g. between first RAN node and CN) and the S1 interface (between CN and second RAN node). To that end in case of S1 interface the messages that could be used are S1: eNB CONFIGURATION TRANSFER, S1: MME CONFIGURATION TRANSFER. In the case of the NG interface on the other hand the messages NG: UL RAN CONFIGURATION TRANSFER and NG: DL RAN CONFIGURATION TRANSFER could be used. The energy consumption information could be added in the SON Configuration Transfer IEs or the Inter-System SON Configuration Transfer IE or alternatively introduce a new IE altogether.

Machine Learning Related Action

The information obtained from connected DUs, and neighboring nodes enable a source node to optimize the total energy consumed in both source/target node using machine learning.

First of all, the energy consumed by the RAN node can be optimized using the information collected from the DU and the connected RUs. Up to a certain traffic load, and given certain QoS requirements, the RAN node can optimize its energy consumption by performing PHY layer adjustment (frequency, antenna, DTX, Sleep modes, etc.). With knowledge of the energy consumption at the DU and lower layers, a node gains an understanding of how its energy efficiency improves when taking certain actions involving its own configuration such as turn off certain antennas, digital receiver chains, adjusting its own DTX cycle, or reduce the bandwidth used in the cell. This information can be used as an input for a machine learning assisted solution to aid the node to predict which action is best from energy saving perspective in a certain traffic load and QoS requirements.

By adopting the methods described herein, the receiving node gains an understanding of how energy efficiency improves when taking certain actions such as offloading traffic or deactivating cells. The receiving node may therefore predict what are the most appropriate actions to take in order to achieve an optimal energy efficiency configuration not only regarding the responding RAN node but also involving all the RAN nodes that might have exchanged energy consumption information with the RAN node.

Figure 10:
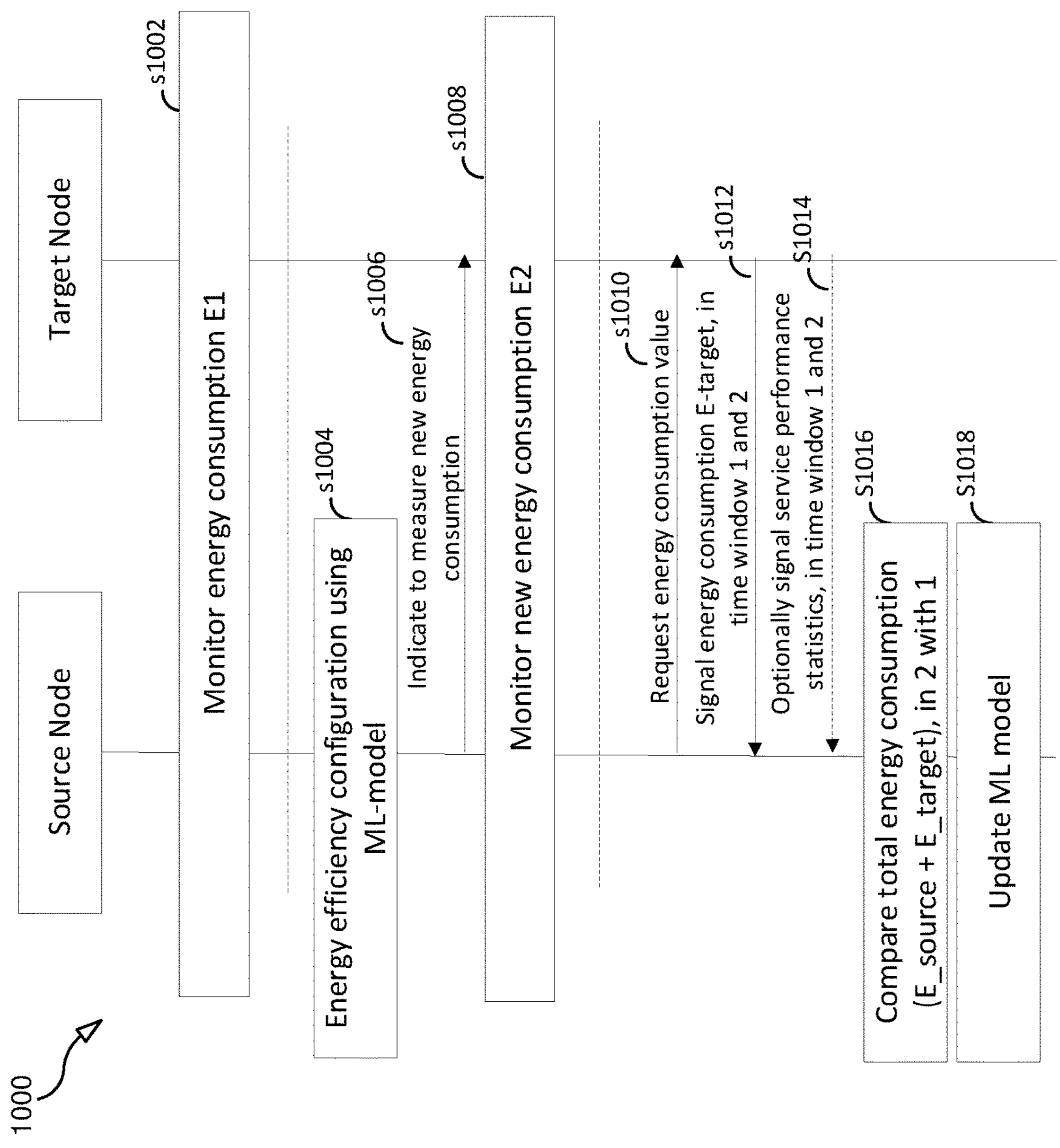
FIG. 10 is a flowchart illustrating a process according to some embodiments.

FIG. 10 is a flowchart illustrating a process according to some embodiments. Process 1000 is one example of how ML can be used to utilize the collected energy consumption information collected from neighboring nodes to optimize the overall energy consumption.

In one embodiment, the ML model can be trained and inferred in a source node. In another embodiment, the source node may receive the trained model from a second node (e.g. OAM or another RAN node). In one example, the source node of the mobility event may be a first node, and the target node of the mobility even may be a second network node At step 1002, the source node monitors and collects input data (e.g. energy consumption status, load situation, etc.) from neighboring nodes. The signaling between the first and second node to obtain the energy consumption status is describe above in connection with FIGS. 2-9.

Figure 1:
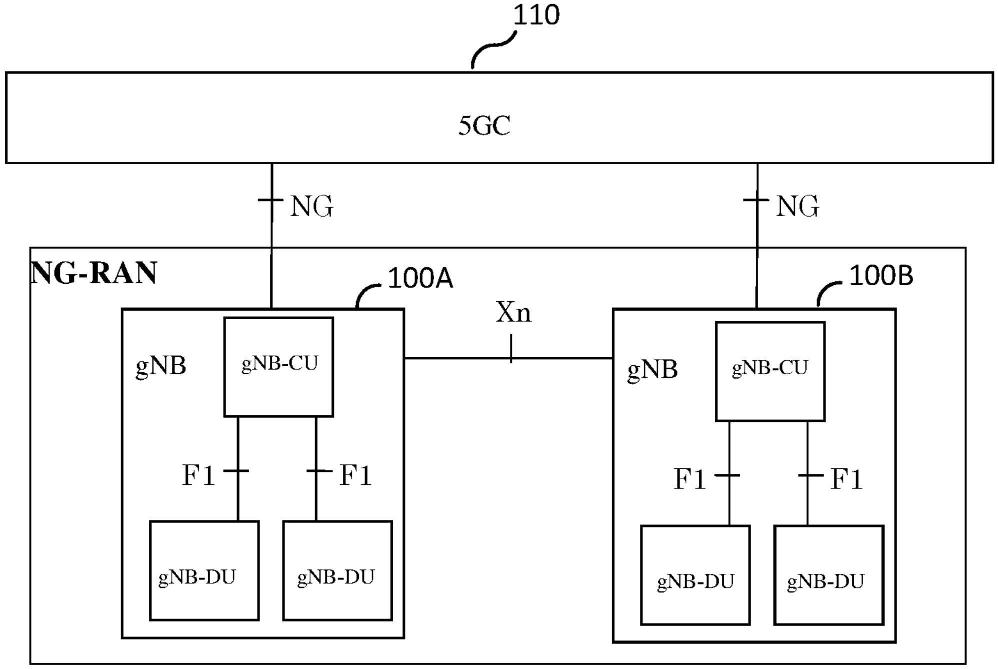
FIG. 1 is an architecture diagram according to some embodiments.

At step 1004, based on the collected data, the source node predicts an energy saving action that maximizes the energy efficiency of the network, while fulfilling the quality-of-service requirements. Such actions may include (offloading of UEs, turning on/off capacity cells, adjusting its own configuration, etc.). The quality-of-service requirements can be an absolute threshold defined by the operator, for example that at least x % of the connections should have a bitrate more than y Mbps. In another embodiment, the requirement can be relative to the peak-hour performance statistics. For example, the service performance with energy savings should not drop below the performance when serving traffic under peak hours (with no energy efficiency action activated). The service performance can be signaled from the target node as shown in FIG. 1.

At step performs the action and monitor the actual impact of the action on the overall network consumption by requesting new information from the neighboring nodes at steps 1006, 1008, and 1010.

The source node obtains the energy consumption values in the two time windows at step 1012. At step 1014, optional service performance statistics may also be obtained. At step 1016, the source node compares the resulting energy consumption to the earlier and forecasted value and use that as a feedback input to the ML mode. At step 1018, the ML model can be updated based on the new findings; this will lead to improved performance when encountering a similar situation in a future time instance.

Figure 11:
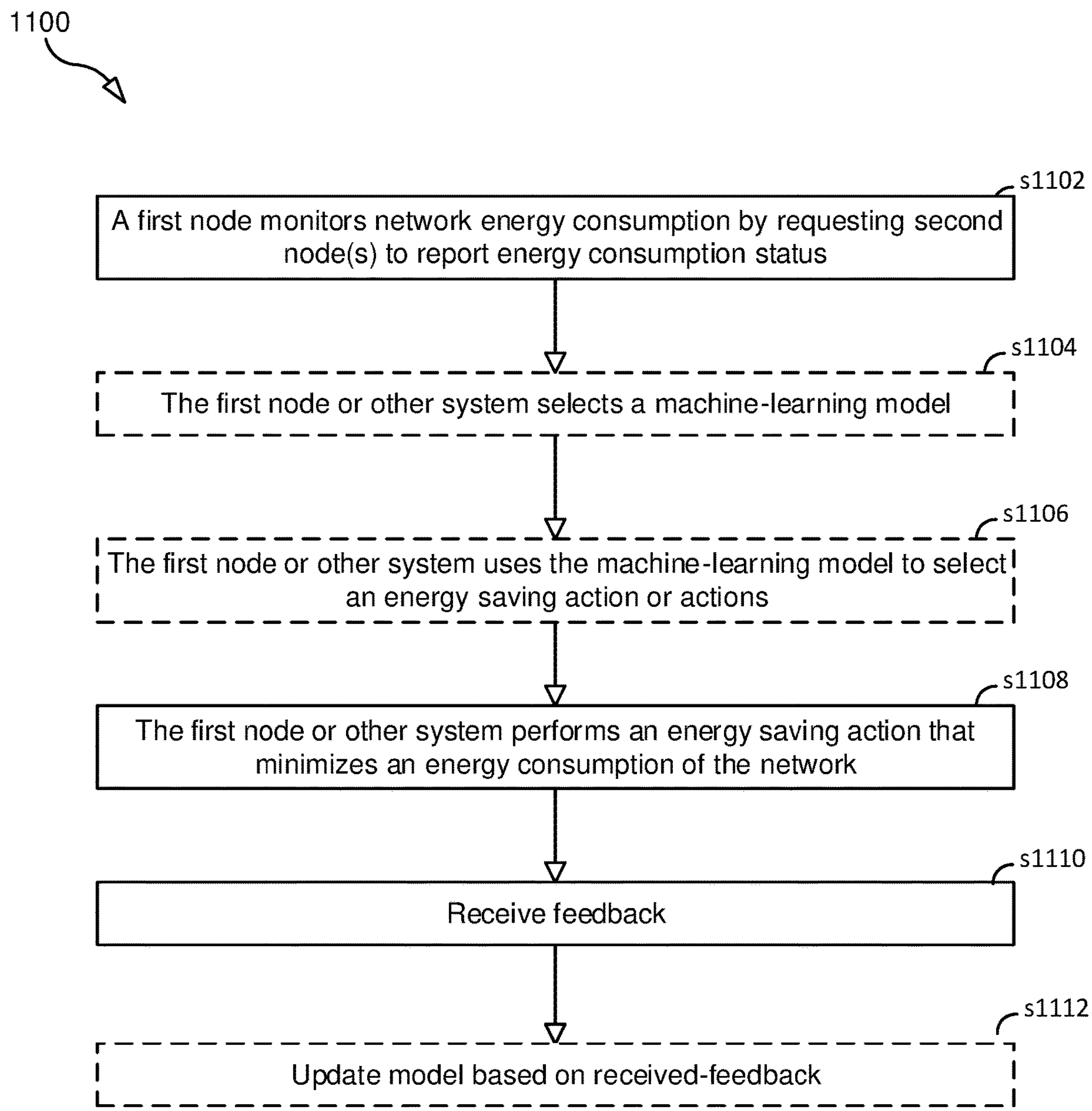
FIG. 11 is a flowchart illustrating a process according to some embodiments.

FIG. 11 is a flow diagram illustrating a process 1100. Optional steps are indicated by dotted boxes. In one example, the first network node may be a source node of the mobility event, whilst the second network node may be a target node of a mobility event involving a UE. At step 1102, a first node monitors network energy consumption by requesting a second node or nodes to report an energy consumption status. At step 1104, which may be optional, the first node or other network entity may select a machine-learning model. Non-limiting examples of machine learning models may include differently configured supervised learning algorithms, reinforcement learning algorithms, contextual multi-armed bandit algorithm, autoregression algorithms, etc. The selection may be based on at least: information collected from the neighboring node, internal RAN information, and/or UE information. At step 1106, which may be optional, the first node or other network entity uses the ML model to select an emerging saving action or actions. The network state information in combination with optional UE state information may be used as input to the model. The configuration of the ML model may further include feedback including contents/information types from other nodes. At step 1108, the first node or network entity performs the energy saving action that minimizes the energy consumption of the network. There may also be an optional feedback triggering criterion, e.g., request for an energy consumption update from neighboring nodes. At step 1110, feedback is received from neighboring nodes, and optionally from UEs. At step 1112, which may be optional, the ML model may be updated based on the received feedback.

Figure 12:
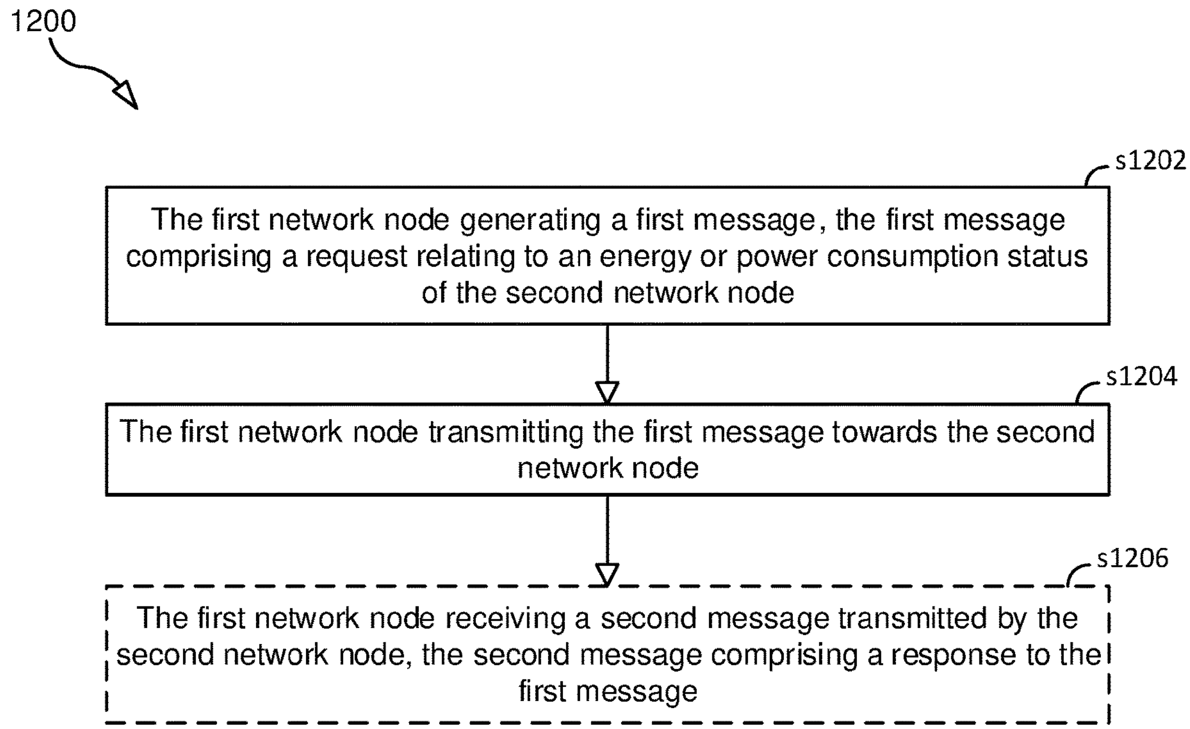
FIG. 12 is a flowchart illustrating a process according to some embodiments.

FIG. 12 is a flow chart illustrating a process 1200, according to some embodiments. Process 1200 may be performed by a first network node with respect to energy metric reporting. In one example, the first network node may be a source node of the mobility event, whilst the second network node may be a target node of a mobility event involving a UE. At step 1202, the first network node generates a first message, the first message comprising a request relating to an energy or power consumption status of the second network node. At step 1204, the first network node transmits the first message towards the second network node. In some embodiments, step 1206 may only optionally be performed. At step 1206, the first network node receives a second message transmitted by the second network node, the second message comprising a response to the first message.

Figure 13:
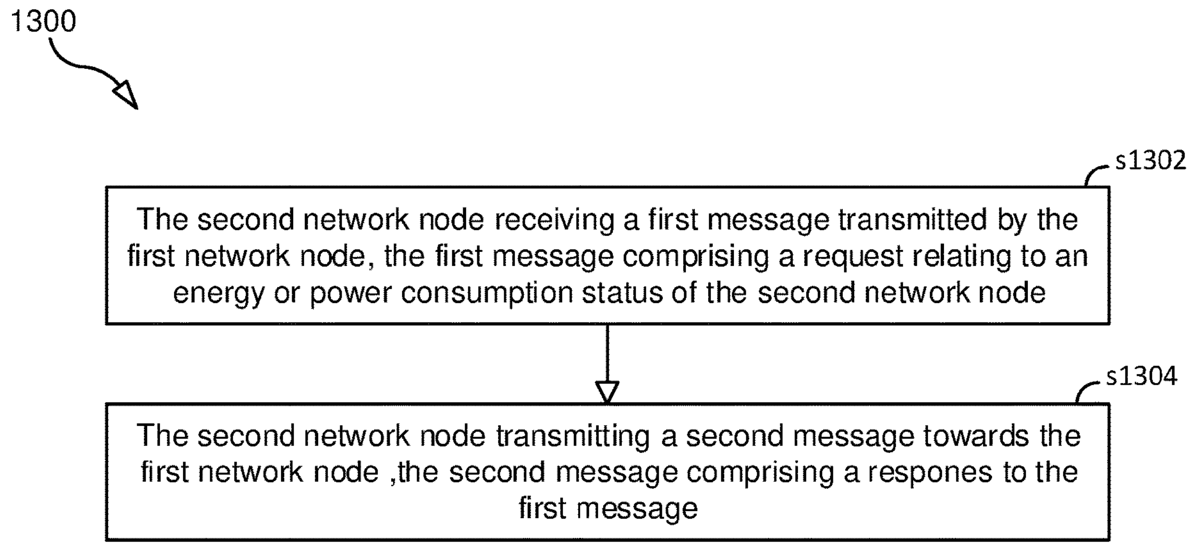
FIG. 13 is a flowchart illustrating a process according to some embodiments.

FIG. 13 is a flow chart illustrating a process 1300, according to some embodiments. Process 1300 may be performed by a second network node for reporting an energy metric to a first network node. In one example, the first network node may be a source node of the mobility event, whilst the second network node may be a target node of a mobility event involving a UE. At step 1302, the second network node receives a first message transmitted by the first network node, the first message comprising a request relating to an energy consumption status of the second network node. At step 1304, the second network node transmits a second message towards the first network node, the second message comprising a response to the first message.

Figure 14:
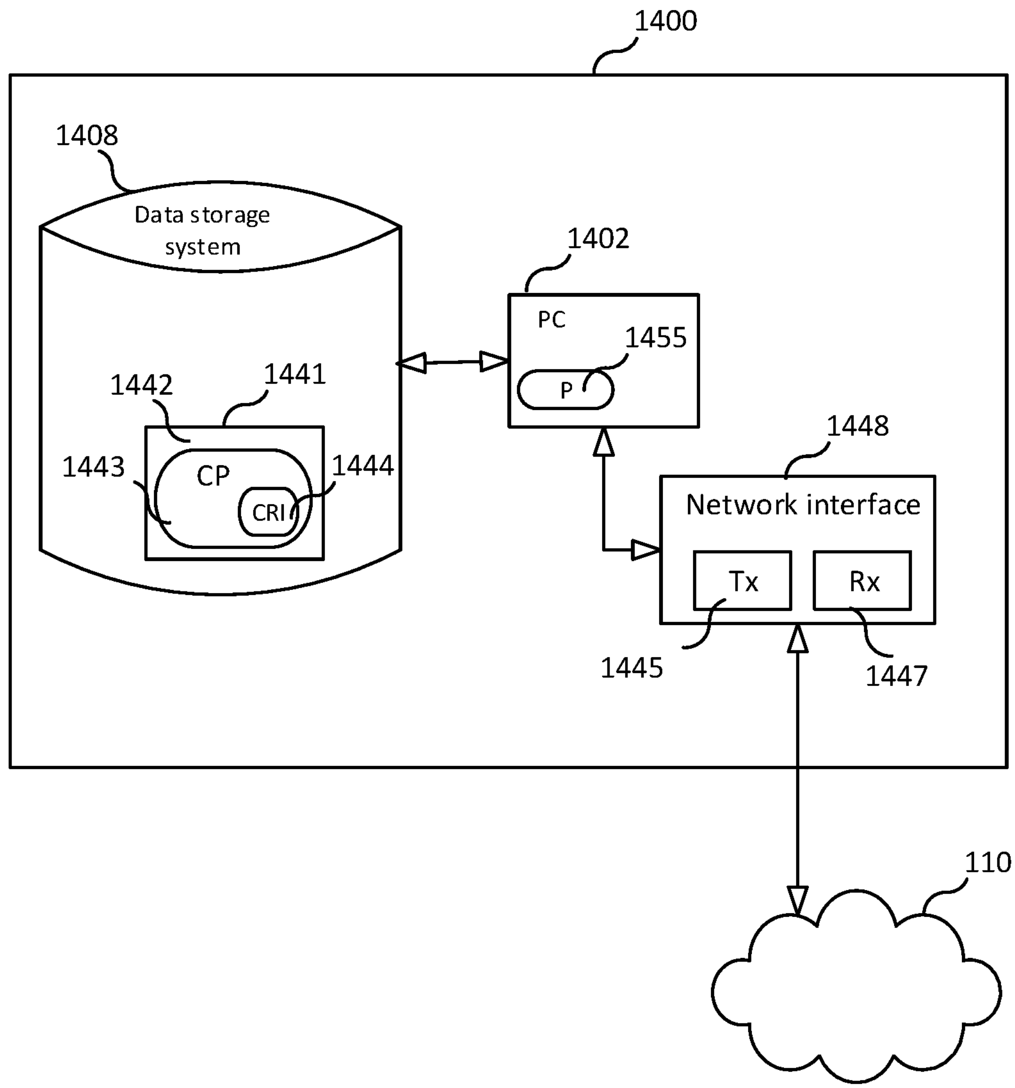
FIG. 14 is a block diagram of an apparatus according to some embodiments.

FIG. 14 is a block diagram of an apparatus, according to some embodiments, for performing the methods disclosed herein (e.g., the first or second network node may be implemented using network node apparatus 1400). In some embodiments, network node apparatus 800 may correspond to gNB 100A or 100B as shown in FIG. 1. As shown in FIG. 14, network node apparatus 1400 may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1400 may be a distributed computing apparatus); at least one network interface 1448 comprising a transmitter (Tx) 1445 and a receiver (Rx) 1447 for enabling apparatus 1400 to transmit data to and receive data from other nodes connected to a network 110 (e.g., an Internet Protocol (IP) network) to which network interface 1448 is connected (directly or indirectly) (e.g., network interface 1448 may be wirelessly connected to the network 110, in which case network interface 1448 is connected to an antenna arrangement); and a storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes apparatus 1400 to perform steps described herein (e.g., steps described herein with reference to the flow charts). In other embodiments, apparatus 1400 may be configured to perform steps described herein without the need for code. That is, for example, PC 1402 may consist merely of one or more ASICs. Hence, the features of the embodiments described herein may be implemented in hardware and/or software.

According to embodiments, a central node, as referred to herein, may be implemented as a physical or virtual node, and may be implemented as a physical or virtual node in a computing device or server apparatus and/or in a virtualized environment, for example in a cloud, edge cloud or fog deployment. The central node may be implemented to provide a dedicated service, such as for example implementing a machine learning model, or be implemented as part of a RAN or CN node.

SUMMARY OF VARIOUS EMBODIMENTS

First Network Node Embodiments

A1. A method performed by a first network node (110A, 1400) for coordinating with a second network node (110B, 1400) with respect to energy metric reporting, the method comprising:

- the first network node generating a first message (s1202), the first message comprising a request relating to an energy or power consumption status of the second network node;
- the first network node transmitting (s1204) the first message towards the second network node; and
- the first network node receiving (s1206) a second message transmitted by the second network node, the second message comprising a response to the first message.

A2. The method of embodiment A1, wherein the request comprises an indication of a triggering mechanism for the second network node to initiate a report of the energy consumption status.

A3. The method of embodiment A2, wherein the triggering mechanism comprises one of:

- initiation of a one-time energy consumption status report over a specified interval of time,
- initiation of an energy consumption status report according to a reporting periodicity, or
- initiation of an energy consumption status report based on a triggering condition.

A4. The method of embodiment A3, wherein the triggering condition comprises a change in an energy consumption metric exceeding a specified threshold.

A5. The method of any one of embodiments A1-A4, wherein the request comprises an indication to report the energy consumption status for at least one of a specified: bit, cell, beam, network node, slice, channel, antenna site, transmitter, receiver, bearer type, or quality of service (QOS) parameter.

A6. The method of any one of embodiments A1-A5, wherein the request comprises an indication to report a load corresponding to a reported energy consumption metric.

A7. The method of any one of embodiments A1-A6, wherein the request comprises an indication for the second network node to measure and/or estimate the energy consumption status of the second network node for one or more load levels.

A8. The method of any one of embodiments A1-A7, wherein the request comprises an indication of a time interval corresponding to a measurement for reporting the energy consumption status of the second network node.

A9. The method of any one of embodiments A1-A8, wherein the request comprises an indication for the second network node to estimate and report the energy consumption status of the second network node as a result of one or more proposed actions.

A10. The method of embodiment A9, wherein the proposed action comprises the first network node offloading an amount of network traffic to the second network node.

A11. The method of embodiment A9, wherein the proposed action comprises the second network node modifying a coverage of a radio cell currently being served by the second network node or the first network node modifying a coverage of a radio cell currently being served by the first network node.

A12. The method of any one of embodiments A1-A11, wherein the request comprises an indication for the second network node to start, pause, resume, or stop reporting of the energy consumption status of the second network node.

A13. The method of any one of embodiments A1-A12, wherein the energy consumption status comprises one or more of an actual or estimated one of the following parameters:

- an energy consumption metric,
- a measurement of energy per at least one of a bit, cell, beam, RAN node, —slice, one or more RAN node Distributed Unit, one or more radio units
- a measurement of energy consumption in joule/bit,
- a measurement of energy consumption in watt per bit per hertz,
- a measurement of energy consumption provided as a percentage of a nominal value,
- an energy per bit to noise power spectral density ratio, ENR per bit,
- a function, that takes a load as input to the function,
- a representation of energy efficiency,
- an indication of energy consumed by the second network node relative to a maximum of energy consumption reachable by the second network node,
- an indication of an overall possible available increase in energy consumption relative to a current energy consumption,
- an indication of a change in energy consumption relative to a last reported value,
- a measure comprising statistical values,
- an energy consumption index from a predefined scale,
- an energy consumption state out of one or more predefined states,
- an indication of an energy source, or
- an indication of a change in energy consumption.

A14. The method of any one of embodiments A1-A13, wherein the response to the first message comprises one or more of:

- an measured energy consumption status,
- an estimated energy consumption status,
- a load status report corresponding to an energy consumption status, or
- an indication if the second network node is operating at a full or reduced energy consumption capacity.

A15. The method of any one of embodiments A1-A14, wherein the first message is a resource status request message (401, 701), and the resource status request message comprises an indication to report the energy consumption status of the second network node.

A16. The method of any one of embodiments A1-A15, wherein the second message is a resource status update message (605, 905), and the resource status update message comprises an energy consumption status metric.

A17. The method of any one of embodiments A1-A14, wherein the first message is a configuration transfer message and the second message is a configuration transfer message.

A18. The method of any one of embodiments A1-A17, further comprising:

- the first network node determining, based on the response to the first message, an action that improves energy efficiency of the first network node and/or the second network node.

A19. The method of embodiment A18, further comprising:

- the first network node performing the action or transmitting a message to initiate the action.

First Network Node—Machine Learning Model Embodiments

A20. The method of embodiment A18 or A19, the method further comprising:

- the first network node providing, to a machine learning model, input based on the response to the first message (s1104); and
- the first network node obtaining an output generated by the machine learning mode (s1106), the output comprising an indication of the action that improves energy efficiency of the first network node and/or the second network node.

A21 The method of embodiment A20, wherein the machine learning model is implemented in the first network node.

A22 The method of embodiment A20, wherein the machine learning model is implemented in a central node, and wherein:

- the providing comprises the first network node transmitting the input towards the central node; and
- the obtaining comprises receiving the output transmitted by the central node.

A23. The method of any one of embodiments A18-A22, wherein the action comprises one or more of:

- offloading one or more user equipments from the first network node or the second network node,
- turning on or turning off capacity cells, or
- adjusting a configuration of the first network node or the second network node.

A24. The method of any one of embodiments A18-A23, wherein the determining further comprises determining that the action satisfies a quality-of-service requirement.

A25. The method of any one of embodiments A19-22, further comprising:

- the first network node generating a third message, the third message comprising a second request relating to an energy consumption status of the second network node;
- the first network node transmitting (s1010) the third message to the second network node; and
- the first network node receiving (s1012) a fourth message transmitted by the second network node, the fourth message comprising a response to the third message.

A26. The method of embodiment A25, further comprising:

- comparing (s1016) the response in the fourth message to the response in the second message; and
- updating the machine learning model based on the comparison (s1018).

A27. The method of any one of embodiments A1-A25, wherein the transmitting the first message towards the second network node comprises transmitting the first message to a control node in communication with the second network node; and wherein the receiving the second message comprises receiving the second message from the control node.

A28. A method performed by a first network node (110A, 1400) for coordinating with a second network node (110B, 1400) with respect to energy metric reporting, the method comprising:

the first network node generating a first message (s1202), the first message comprising a request relating to an energy or power consumption status of the second network node; and the first network node transmitting (s1204) the first message towards the second network node.

A29. A first network node (100A, 1400) in a radio access network (110) configured to:

generate a first message (s1202), the first message comprising a request relating to an energy or power consumption status of the second network node;

transmit (s1204) the first message towards the second network node; and receive (s1206) a second message transmitted by the second network node, the second message comprising a response to the first message.

A30. The network node of embodiment A29, further adapted to perform any one of methods A1-A28.

A31. A computer program (1443) comprising instructions (1444) which when executed by processing circuitry (1455) of a first network node (100A, 1400) causes the first network node to perform the method of any one of methods A1-A28.

A32. A carrier containing the computer program of embodiment A31, wherein the carrier is one of an electronic signal, an optical signal, a radio signal, and a computer readable storage medium (1442).

Second Network Node Embodiments

B1. A method performed by a second network node (100B, 1400) for reporting an energy metric to a first network node, the method comprising:

the second network node receiving (s1302) a first message transmitted by the first network node, the first message comprising a request relating to an energy or power consumption status of the second network node; and the second network node transmitting (s1304) a second message towards the first network node, the second message comprising a response to the first message.

B2. The method of embodiment B1, wherein the request comprises an indication of a triggering mechanism for the second network node to initiate a report of the energy consumption status.

B3. The method of embodiment B2, wherein the second network node transmits the second message based on the triggering mechanism.

B4. The method of any one of embodiments B2-B3, wherein the triggering mechanism comprises one of:

initiation of a one-time energy consumption status report over a specified interval of time, initiation of an energy consumption status report according to a reporting periodicity, or initiation of an energy consumption status report based on a triggering condition.

B5. The method of embodiment B4, wherein the triggering condition comprises a change in an energy consumption metric exceeding a specified threshold.

B6. The method of any one of embodiments B1-B5, wherein the request comprises an indication to report the energy consumption status for at least one of a specified: bit, cell, beam, network node, slice, channel, antenna site, transmitter, receiver, bearer type, or quality of service (QOS) parameter.

B7. The method of any one of embodiments B1-B2, wherein the request comprises an indication to report a load corresponding to a reported energy consumption metric.

B8. The method of any one of embodiments B1-B7, wherein the request comprises an indication for the second network node to estimate the energy consumption status of the second network node for one or more load levels.

B9. The method of any one of embodiments B1-B8, wherein the request comprises an indication of a time interval corresponding to a measurement for reporting the energy consumption status of the second network node.

B10. The method of any one of embodiments B1-B9, wherein the request comprises an indication for the second network node to estimate and report the energy consumption status of the second network node as a result of one or more proposed actions.

B11. The method of embodiment B10, wherein the proposed action comprises the first network node offloading an amount of network traffic to the second network node.

B12. The method of embodiment B11, wherein the proposed action comprises the second network node modifying a coverage of a radio cell currently being served by the second network node or the first network node modifying a coverage of a radio cell currently being served by the first network node.

B13. The method of any one of embodiments B1-B12, wherein the request comprises an indication for the second network node to start, pause, resume, or stop reporting of the energy consumption status of the second network node.

B14. The method of any one of embodiments B1-B13, wherein the energy consumption status comprises an actual or estimated one or more of the following parameters:

an energy consumption metric, a measurement of energy per at least one of a bit, cell, beam, RAN node, or slice, a measurement of energy consumption in joule/bit, a measurement of energy consumption in watt per bit per hertz, a measurement of energy consumption provided as a percentage of a nominal value, an energy per bit to noise power spectral density ratio, ENR per bit, a function, that takes a load as input to the function, a representation of energy efficiency, an indication of energy consumed by the second network node relative to a maximum of energy consumption reachable by the second network node, an indication of an overall possible available increase in energy consumption relative to a current energy consumption, an indication of a change in energy consumption relative to a last reported value, a measure comprising statistical values, an energy consumption index from a predefined scale, an energy consumption state out of one or more predefined states, an indication of an energy source, or an indication of a change in energy consumption.

B15. The method of any one of embodiments B1-B14, wherein the response to the first message comprises one or more of:

an energy consumption status, an estimated energy consumption status, a load status report corresponding to an energy consumption status, or an indication if the second network node is operating at a full or reduced energy consumption capacity.

B16. The method of any one of embodiments B1-B15, wherein the first message is a resource status request message, and the resource status request message comprises an indication to report the energy consumption status of the second network node.

B17. The method of any one of embodiments B1-B16, wherein the second message is a resource status update message, and the resource status update message comprises an energy consumption status metric.

B18. The method of any one of embodiments B1-B15, wherein the first message is a configuration transfer message and the second message is a configuration transfer message.

B19. The method of any one of embodiments B1-B18, wherein the first message further comprises an indication of an action that improves energy efficiency of the first network node or the second network node.

B20. The method of embodiment B19, further comprising:

the second network node performing the action.

B21. The method of embodiment B19 or B20, wherein the first message further comprises a metric relating to an energy consumption status of the first network node if the action is performed.

B22. The method of any one of embodiments B1-B22, wherein the receiving the first message comprises receiving the first message from a control node in communication with the first network node; and wherein the transmitting the second message towards the first network node comprises transmitting the second message to the control node.

B23. A second network node (100B, 1400) in a radio access network (110) configured to:

receive (s1302) a first message transmitted by a first network node, the first message comprising a request relating to an energy or power consumption status of the second network node; and transmit (s1304) a second message towards the first network node, the second message comprising a response to the first message.

B24. The network node of embodiment B23, further adapted to perform any one of methods B1-22.

B25. A computer program (1443) comprising instructions (1444) which when executed by processing circuitry (1455) of a second network node (100B, 1400) causes the second network node to perform the method of any one of methods B1-B22.

B26. A carrier containing the computer program of embodiment B25, wherein the carrier is one of an electronic signal, an optical signal, a radio signal, and a computer readable storage medium (1442).

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

3GPP 3$^{rd}$ Generation Partnership Project
5GCN 5G Core Network
5GS 5G System
AMF Access and Mobility Management Function
AN Access Network
CN Core Network
CNC Central Network Controller
CP Control Plane
CRS Cell-specific reference signal
CU Central Unit
DC Dual Connectivity
DU Distributed Unit
eNB E-UTRAN NodeB
EN-DC E-UTRA-NR Dual Connectivity
E-UTRA Evolved UTRA
E-UTRAN Evolved UTRAN
gNB Radio base station in NR
GBR Guaranteed Bit Rate
ID Identifier/Identity
IE Information Element
LTE Long Term Evolution
MME Mobility Management Entity
MN Master Node
MR-DC Multi-Radio Dual Connectivity
NE-DC NR-E-UTRA Dual Connectivity
NG Next Generation
NGEN-DC NG-RAN E-UTRA-NR Dual Connectivity
NG-RAN NG Radio Access Network
NR New Radio
OAM/O&M Operation and Maintenance
QCI QoS Class Identifier
QoE Quality of Experience
QoS Quality of Service
RAN Radio Access Network
RAT Radio Access Technology
RRC Radio Resource Control
S1 The interface between the RAN and the CN in LTE.
S1AP S1 Application Protocol
SN Secondary Node
SSB Synchronization Signal/PBCH block
UAI Unified Air Interface
UE User Equipment

The invention claimed is:

1. A method performed by a first base station for coordinating with a second base station with respect to energy metric reporting, the method comprising:

the first base station generating a first message, the first message comprising a request relating to an energy consumption status of the second base station;

the first base station transmitting the first message towards the second base station; and the first base station receiving a second message transmitted by the second base station, the second message comprising a response to the first message, wherein the response comprises a measured energy consumption metric.

2. The method of claim 1, wherein the request comprises an indication of a triggering mechanism for the second base station to initiate a report of the energy or power consumption status.

3. The method of claim 2, wherein the triggering mechanism comprises one or more of:

initiation of a one-time energy or power consumption status report over a specified interval of time, initiation of an energy or power consumption status report according to a reporting periodicity, or initiation of an energy or power consumption status report based on a triggering condition.

4. The method of claim 3, wherein the triggering condition comprises a change in an energy or power consumption metric of the second base station exceeding a specified threshold.

5. The method of claim 1, wherein the request comprises at least one of:

an indication to report the energy or power consumption status for at least one of a specified: bit, cell, beam, network node, network slice, channel, antenna site, transmitter, receiver, bearer type, or quality of service (QoS) parameter, an indication to report a load corresponding to a reported energy or power consumption metric, an indication for the second base station to measure and/or estimate the energy or power consumption status of the second base station for one or more load levels, an indication of a time interval corresponding to a measurement for reporting the energy or power consumption status of the second base station, an indication for the second base station to estimate and report the energy or power consumption status of the second base station as a result of one or more proposed actions, an indication for the second base station to start, pause, resume, or stop reporting of the energy or power consumption status of the second base station.

6. The method of claim 5, wherein a proposed action of the one or more proposed actions comprises at least one of:

the first base station offloading an amount of network traffic to the second base station, the second base station modifying a coverage of a radio cell currently being served by the second base station, or the first base station modifying a coverage of a radio cell currently being served by the first base station.

7. The method of claim 1, wherein the first message is a resource status request message and the resource status request message comprises an indication to report the energy or power consumption status of the second base station, and wherein the second message is a resource status update message, and the resource status update message comprising an energy or power consumption status metric.

8. The method of claim 1, wherein the first message is a first configuration transfer message and the second message is a second configuration transfer message.

9. The method of claim 1, further comprising:

the first base station determining, based on the response to the first message, an action that improves energy efficiency of the first base station and/or the second base station.

10. The method of claim 9, further comprising:

the first base station performing the action or transmitting a message to initiate the action.

11. The method of claim 10, further comprising:

the first base station generating a third message, the third message comprising a second request relating to an energy or power consumption status of the second base station;

the first base station transmitting the third message to the second base station;

the first base station receiving a fourth message transmitted by the second base station, the fourth message comprising a response to the third message;

comparing the response in the fourth message to the response in the second message; and updating the machine learning model based on the comparison.

12. The method of claim 9, the method further comprising:

the first base station providing, to a machine learning model, input based on the response to the first message; and the first base station obtaining an output generated by the machine learning model, the output comprising an indication of the action that improves energy efficiency of the first base station and/or the second base station.

13. The method of claim 12, wherein the machine learning model is implemented in the first base station.

14. The method of claim 12, wherein the machine learning model is implemented in a central node, and wherein:

the providing comprises the first base station transmitting the input towards the central node; and the obtaining comprises receiving the output transmitted by the central node.

15. The method of claim 9, wherein the action comprises one or more of:

offloading one or more user equipment from the first base station or the second base station, turning on or turning off cells, or adjusting a configuration of the first base station or the second base station.

16. The method of claim 9, wherein the determining further comprises determining that the action satisfies a quality-of-service requirement.

17. The method of claim 1, wherein the transmitting the first message towards the second base station comprises transmitting the first message to a control node in communication with the second base station, and wherein the receiving the second message comprises receiving the second message from the control node.

18. A first base station in a radio access network comprising a processor coupled to a non-transitory computer readable medium, wherein the processor is configured to:

generate a first message, the first message comprising a request relating to an energy or power consumption status of a second base station;

transmit the first message towards the second base station; and receive a second message transmitted by the second base station, the second message comprising a response to the first message, wherein the response comprises a measured energy consumption metric.

19. A method performed by a second base station for reporting an energy metric to a first base station, the method comprising:

the second base station receiving a first message transmitted by the first base station, the first message comprising a request relating to an energy or power consumption status of the second base station; and the second base station transmitting a second message towards the first base station, the second message comprising a response to the first message, wherein the response comprises a measured energy consumption metric.

20. A second base station in a radio access network, the second base station comprising a processor coupled to a non-transitory computer readable medium, wherein the processor is configured to:

receive a first message transmitted by a first base station, the first message comprising a request relating to an energy or power consumption status of the second base station; and transmit a second message towards the first base station, the second message comprising a response to the first message, wherein the response comprises a measured energy consumption metric.

* * * * *